(12) United States Patent
Cypher

(10) Patent No.: US 6,453,440 B1
(45) Date of Patent: Sep. 17, 2002

(54) SYSTEM AND METHOD FOR DETECTING DOUBLE-BIT ERRORS AND FOR CORRECTING ERRORS DUE TO COMPONENT FAILURES

(75) Inventor: Robert Cypher, Saratoga, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/368,209

(22) Filed: Aug. 4, 1999

(51) Int. Cl.⁷ .................... H03M 13/00; H03M 13/03
(52) U.S. Cl. ............................ 714/758; 714/785
(58) Field of Search .................. 714/758, 761, 714/753, 746, 785, 800, 802

(56) References Cited

U.S. PATENT DOCUMENTS

| | | | |
|---|---|---|---|
| 4,881,232 A | 11/1989 | Sako et al. | |
| 4,995,041 A | 2/1991 | Hetherington et al. | |
| 5,373,513 A | * 12/1994 | Howe et al. | 714/775 |
| 5,450,340 A | 9/1995 | Nicolaidis | |
| 5,612,965 A | * 3/1997 | Michaelson | 714/800 |
| 5,642,366 A | 6/1997 | Lee et al. | |
| 5,721,739 A | 2/1998 | Lyle | |
| 5,831,999 A | 11/1998 | Yamamura | |
| 5,872,799 A | 2/1999 | Lee et al. | |
| 5,898,708 A | * 4/1999 | Tateishi et al. | 714/752 |
| 6,018,817 A | * 1/2000 | Chen et al. | 714/762 |
| 6,041,430 A | * 3/2000 | Yamauchi | 714/752 |

FOREIGN PATENT DOCUMENTS

GB        2 216 690        10/1989

OTHER PUBLICATIONS

Mazumder, "Design of a Fault–Tolerant Three–Dimensional Dynamic Random–Access Memory with On–Chip Error–Correcting Circuit," IEEE Transactions on Computers, vol. 42, No. 12, Dec. 1993, pp. 1453–1468.

Search Report for International Application No. PCT/US 00/20960, mailed Nov. 14, 2000.

Dell, "A White Paper on the Benefits of Chipkill–Correct ECC for PC Server Main Memory," IBM Microelectronics Division, Nov. 1997, pp. 1–23.

(List continued on next page.)

*Primary Examiner*—Albert Decady
*Assistant Examiner*—Cynthia Harris
(74) *Attorney, Agent, or Firm*—Conley, Rose & Tayon, PC; B. Noël Kivlin

(57) ABSTRACT

A system for detecting and correcting errors in a data block includes a check bits generation unit which receives and encodes data to be protected. The check bits generation unit effectively partitions the data into a plurality of logical groups. The check bits generation unit generates a parity bit for each of the logical groups, and additionally generates a pair of global error correction codes, referred to generally as an untwisted global error correction code and a twisted global error correction code. Data at corresponding bit positions within the logical groups are conveyed through a common component. The untwisted global error correction code may be equivalent to the result of generating an individual error correction code for each logical group and XORing the collection of individual error correction codes together. The twisted global error correction code may be equivalent to the result of (or may be derived by) shifting (either linearly or cyclically) the error correction code for a given ith group by i bit positions, wherein i=0 to X−1, and by XORing corresponding columns of the resulting shifted error correction codes together. An error correction unit is coupled to receive the plurality of data bits and the check bits following storage or transmission. The error correction unit is configured to generate a parity error bit for each of the logical groups of data based on the received data bits and the original parity bits, as well as first and second syndrome codes.

26 Claims, 38 Drawing Sheets

OTHER PUBLICATIONS

"Parallel Parity," http://bbs–koi.uniinc.msk.ru/tech1/1994/er_cont/block.htm, 1994, 1 pg.

"Modulo–2 Arithmetic," http://bbs–koi.uniinc.msk.ru/tech1/1994/er_cont/modulo.htm, 1994, 1 pg.

"Introduction to Error Control," http://bbs–koi.uniinc.msk.ru/tech1/1994/er_cont/intro.htm, 1994, 1 pg.

Barker et al. "ASCII Table," http://www.eng2.uconn.edu/cse/Cour . . . 08W/References/ Ref_ASCIITable.html,Feb. 1998, 1 pg.

"Parity & Computing parity," http://bbs–koi.uniinc.msk.ru/tech1/1994/er_cont/parity.htm, 1994, 2 pgs.

"Error Correction with Hamming Codes," http://bbs–koi.uniinc.msk.ru/tech1/1994/er_cont/hamming.htm, 1994, 2pgs.

Barker et al. "Hamming Code, Background Information," http://www.eng2.uconn.edu/cse/Courses/CSE208W/Hamming/Background.html, Feb. 1998, 3 pgs.

Barker et al., "Hamming Code, Theory," http://www.eng2.uconn.edu/cse/Courses/CSE208W/Hamming/Theory.html, Mar. 1998, 2 pgs.

"NUMA: Delivering the Next Level of Commodity SMP Performance," http://199.245.235.23/newsletters/html/vpoint5.html, 1996, 4 pgs.

Barker et al. "General Definitions," http://www.eng2.uconn.edu/cse/Cour . . . 8W/References/Ref_Definitions.html, Feb. 1998, 3 pgs.

Barker et al. "Hamming Code, Lab Procedure," http://www.eng2.uconn.edu/cse/Courses/CSE208W/Hamming/Procedure.html, Jun. 1998, 3 pgs.

* cited by examiner

| CHECK BIT | DATA BITS |
|-----------|-----------|
| P1 | D4,D3,D1 |
| P2 | D4,D2,D1 |
| P3 | D3,D2,D1 |

DATA BLOCK

| BIT POSITION | 1 | 2 | 3 | 4 | 5 | 6 | 7 |
|---|---|---|---|---|---|---|---|
| PARITY / DATA BIT | P1 | P2 | D4 | P3 | D3 | D2 | D1 |

FIG. 3
(Prior Art)

| RECEIVED BITS | SYNDROME |
|---|---|
| P1, D4, D3, D1 | S1 |
| P2, D4, D2, D1 | S2 |
| P3, D3, D2, D1 | S3 |

FIG. 4
(Prior Art)

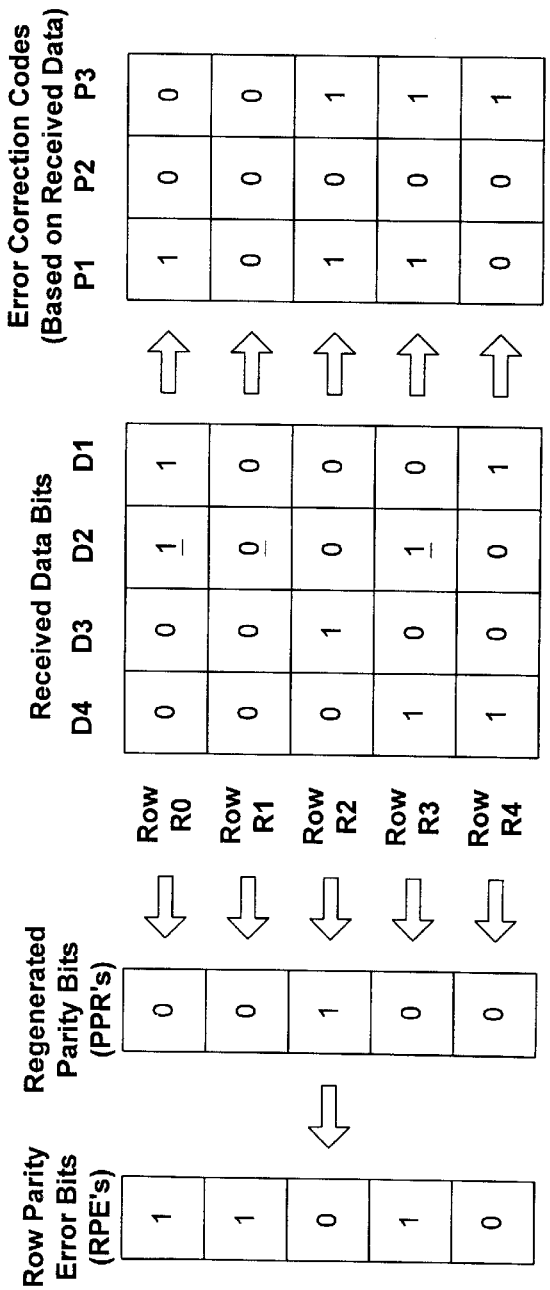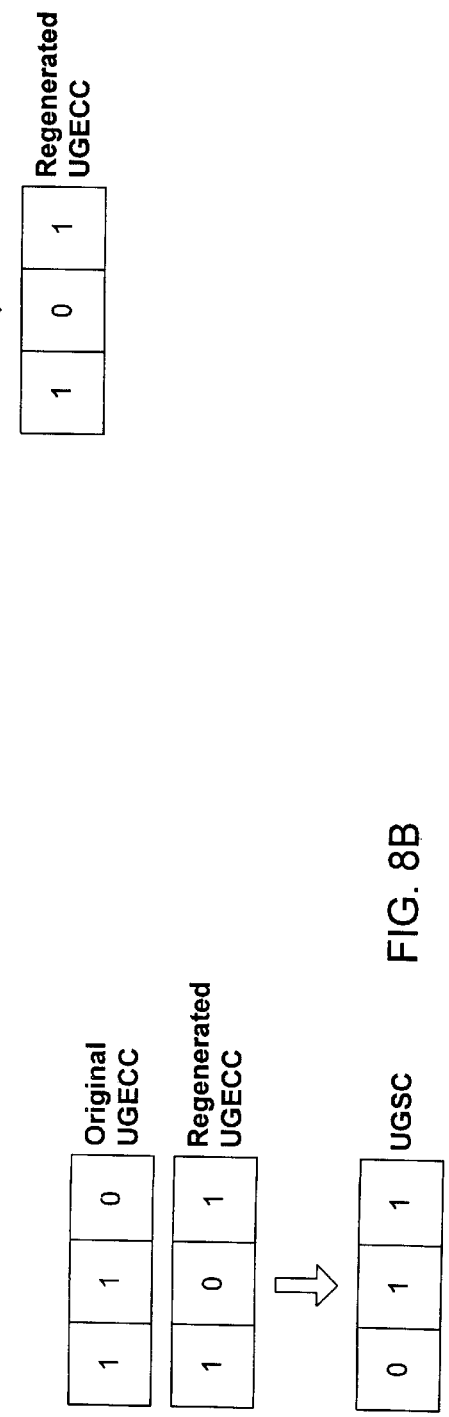
FIG. 8A
FIG. 8B

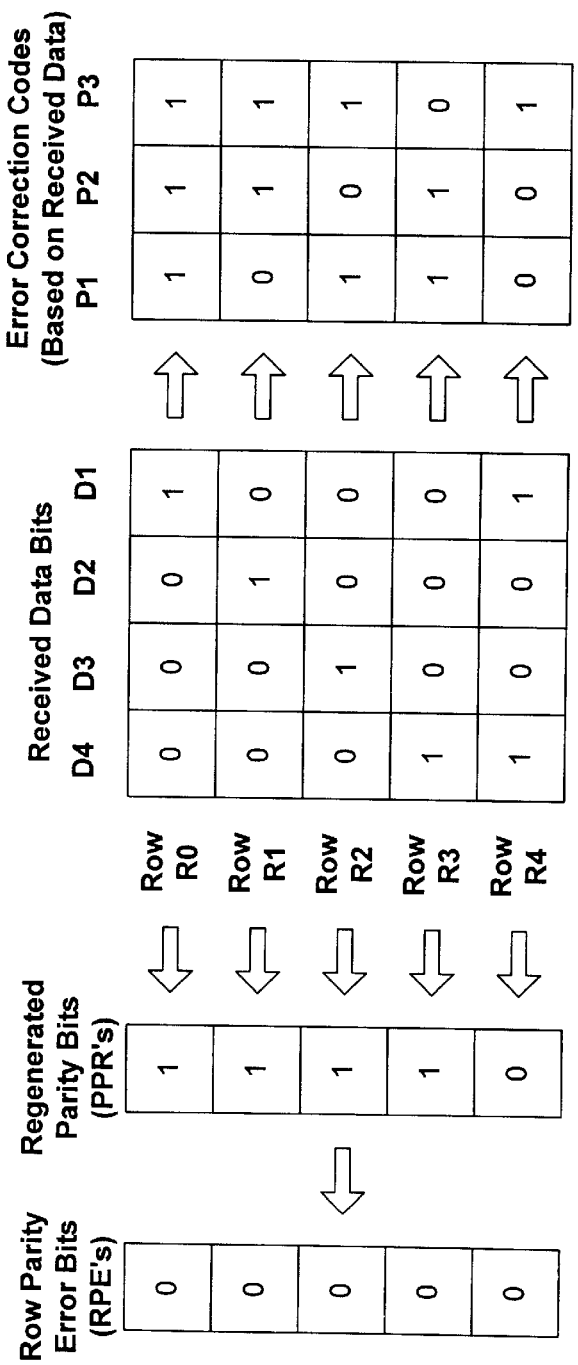
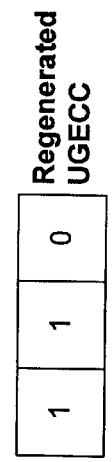
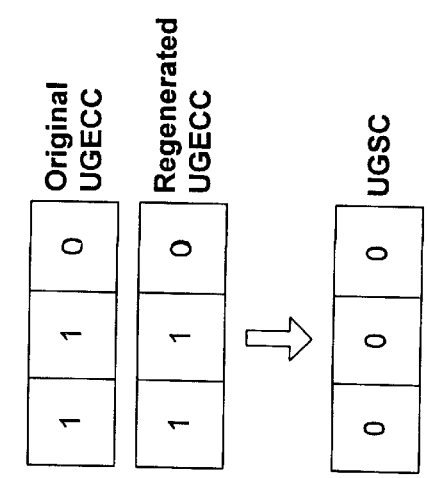
FIG. 12C
FIG. 12D

SYSTEM AND METHOD FOR DETECTING DOUBLE-BIT ERRORS AND FOR CORRECTING ERRORS DUE TO COMPONENT FAILURES

BACKGROUND OF THE INVENTION

1. Field of the Invention

This invention relates to error detection and correction in electronic systems and, more particularly, to systems that employ error correction codes to facilitate detection and correction of bit errors.

2. Description of the Related Art

Error codes are commonly used in electronic systems to detect and correct data errors, such as transmission errors or storage errors. For example, error codes may be used to detect and correct errors in data transmitted via a telephone line, a radio transmitter, or a compact disc laser. Error codes may additionally be used to detect and correct errors associated with data stored in the memory of computer systems. One common use of error codes is to detect and correct errors of data transmitted on a data bus of a computer system. In such systems, error correction bits, or check bits, may be generated for the data prior to its transfer or storage. When the data is received or retrieved, the check bits may be used to detect and correct errors within the data.

Component failures are a common source of error in electrical systems. Faulty components may include faulty memory chips or faulty data paths provided between devices of a system. Faulty data paths can result from, for example, faulty pins, faulty data traces, or faulty wires.

Hamming codes are a commonly used type of error code. The check bits in a Hamming code are parity bits for portions of the data bits. Each check bit provides the parity for a unique subset of the data bits. If an error occurs (i.e. one or more of the data bits unintentionally change state), one or more of the check bits upon regeneration will also change state (assuming the error is within the class of errors covered by the code). By determining the specific bits of the regenerated check bits that changed state, the location of the error within the data may be determined. For example, if one data bit changes state, this data bit will cause one or more of the regenerated check bits to change state. Because each data bit contributes to a unique group of check bits, the check bits that are modified will identify the data bit that changed state. The error may be corrected by inverting the bit identified as being erroneous.

One common use of Hamming codes is to correct single bit errors within a group of data. Generally speaking, the number of check bits must be large enough such that $2^k-1$ is greater than or equal to n+k where k is the number of check bits and n is the number of data bits. Accordingly, seven check bits are typically required to implement a single error correcting Hamming code for 64 data bits. A single error correcting Hamming code is capable of detecting and correcting a single error.

FIGS. 1–3 illustrate an example of a system employing a single-error correction (SEC) Hamming code. In this example, four data bits (D4, D3, D2, and D1) are protected using three check bits (P1, P2, and P3). The parity generator 10 (FIG. 1) is used to encode the data block that contains the data bits and the check bits. The encoding process is performed prior to storing or communicating the data. FIG. 2 shows an assignment of data bits to calculate the check bits. In this example, the check bit P1 is generated by an XOR (exclusive OR) of the binary values in D4, D3, and D1. Similarly, the check bit P2 is generated by an XOR of the binary values in D4, D2, and D1, and the check bit P3 is generated by an XOR of the binary values in D3, D2 and D1. FIG. 3 shows the bit positions and the corresponding content of these positions within the encoded data block. The data block, which includes the data bits and the generated check bits, may then be stored in a memory chip or communicated over a data communication path.

At the point of receipt, the data block is retrieved and decoded. The decoding process involves performing a validity check on the received word, and executing an error correction technique if an error was detected. To check whether an error occurred in the storage (or transmission) of the data block, the check bits P1, P2, and P3 are effectively regenerated using the received data, and each regenerated check bit is XORed with the corresponding received check bit to generate a corresponding syndrome bit. FIG. 4 is a table depicting a manner in which these syndrome bits may be generated. More particularly, syndrome bit S1 may be generated by XORing the received binary values in P1, D4, D3, and D1. If none of the received data bits (D4, D3, D1) is erroneous, the value of the received check bit P1 is effectively XORed with itself, and the syndrome bit S1 will be 0 (assuming the original check bit P1 is not erroneous). If one of the data bits (D4, D3, D1) or the check bit P1 is erroneous, the syndrome bit S1 will be 1 (asserted), thus indicating an error. Syndrome bits S2 and S3 may be generated similarly. Taken collectively, the syndrome bits S1, S2 and S3 may be used to identify the location of an erroneous bit. For example, the binary value of the syndrome bits in the order [S3, S2, S1] indicates the position of the erroneous bit within the 7 bit data block as depicted in FIG. 3. If the syndrome code is all zeros (i.e. "000"), the data has no single bit error. Upon identification of the erroneous bit position, the error is corrected by inverting the binary value in that position, i.e. from 0 to 1 or from 1 to 0.

It is a common practice to store data in, or communicate data through, multiple components. For example, a data block may be stored in a plurality of memory chips, or it may be communicated through a plurality of wires. An error may be introduced if one of the components is faulty. A Hamming code such as that described above may be used to address error correction in such systems.

For example, consider the case of storing D bits of data that are protected by C check bits using M memory chips. The data block therefore contains D+C bits. If the data block is to be evenly divided among the M memory chips, each memory chip will store X of the data and/or check bits of the data block, where X=(D+C)/M. The standard approach to providing error correction for chip failures is to divide the D+C data and check bits into X logical groups each including M bits, and assigning 1 bit from each chip to each of the groups. The check bits in each group form a SEC (single-error correcting) code such as a Hamming code. When any chip fails, it introduces at most one error into each group, and these errors are corrected independently using the SEC codes. If a Hamming code is used in each group, a total of C=X*L check bits are required, where L is the smallest integer such that $2^L>M$. This standard approach is inefficient because each group is able to independently identify which bit (if any) within the group is in error. However, if the only failures considered are memory chip failures, the failures in different groups are highly correlated.

In some systems, in addition to correcting single-bit errors due to component failures, it may also be desirable to detect any double-bit errors that may occur. The standard approach is to evenly divide the data block among the memory chips in the manner as described above, and to generate check bits for each group which form an SEC-DED (single-error correcting, double-error detecting) code such as an extended Hamming code. When any chip fails, it introduces at most one error into each group, and these errors are corrected independently using the SEC-DED codes. When two arbitrary bits are in error, they are either corrected (if they lie in different groups) or are detected (if they lie in the same group). If an extended Hamming code is used in each group, a total of C=X*L check bits are required, where L is the smallest integer such that $2^{(L-1)}>M$. Similar to the foregoing discussion, however, the use of extended Hamming codes in such systems is inefficient.

It would be desirable to provide a system and method which allow for the reliable storage or transmission of data in environments wherein component failures are possible. In particular, it would be desirable to provide a system and method which allow for the detection of arbitrary double-bit errors while performing correction of errors due to component failures where the number of required check bits may be reduced.

SUMMARY OF THE INVENTION

The problems outlined above may in large part be solved by a system and method for detecting and correcting errors in a data block in accordance with the present invention. In one embodiment, a system includes a check bits generation unit which receives and encodes data to be protected. The check bits generation unit effectively partitions the data into a plurality of logical groups. The check bits generation unit generates a parity bit for each of the logical groups, and additionally generates a pair of global error correction codes, referred to generally as a first global error correction code and a second global error correction code. In one implementation, data at corresponding bit positions within the logical groups are conveyed through a common component, such as the same wire, or are stored in the same component, such as the same memory chip. Additionally, data bits at different bit positions within a given logical group are not conveyed through, or are not stored within, a common component.

In one particular embodiment, the data is divided into a total of X logical groups. The first global error correction code (also referred to in this embodiment as an "untwisted" global error correction code) is equivalent to the result of generating an individual error correction code for each logical group and XORing the collection of individual error correction codes together. The second global error correction code (also referred to in this embodiment as the "twisted" global error correction code) is equivalent to the result of (or may be derived by) shifting (either linearly or cyclically) the error correction code for a given ith group by i bit positions, wherein i=0 to X−1, and by XORing corresponding columns of the resulting shifted error correction codes together. The data and the check bits (collectively formed by the parity bit for each logical group and the first and second global error correction codes) are then conveyed through a communication channel or are stored in memory.

The system further includes an error correction unit which is coupled to receive the plurality of data bits and the check bits following storage or transmission. The error correction unit is configured to generate a parity error bit for each of the logical groups of data based on the received data bits and the original parity bits. The parity error bits indicate whether a change in parity for each logical group has occurred.

The error correction unit is further configured to generate a regenerated first global error correction code in the same manner in which the original first global error code is derived, using the received data. Thus, in one embodiment, the regenerated first global error correction code is equivalent to the result of generating an individual error correction code for each logical group (of the received data), and XORing them together. A first global syndrome code is then generated by XORing the original first global error correction code with the regenerated first global error correction code.

Subsequent operations of the error correction unit are dependent upon whether an odd number of the parity error bits is asserted or an even number of the parity error bits asserted. In one particular embodiment, in response to detecting that an odd number of the parity error bits are asserted, the error correction unit uses a binary value of the first syndrome code to determine the bit position of any errors within any of the logical groups. Using this information, the error correction unit may correct the errors by inverting the values at the positions indicated as being erroneous.

In an alternative operation, in response to detecting that an even number of the parity error bits are asserted, the error correction unit determines whether the first syndrome code has an all-zeros value. If not, the error correction unit generates an error signal indicating that an uncorrectable error in the data exists. This condition will occur whenever any uncorrectable double-bit error in the data block is present (i.e., when two bits in different positions in any of the logical groups have errors). On the other hand, if the first global syndrome code has an all-zeros value, the error correction unit determines whether any of the parity error bits are asserted. If not, the data is determined to be correct as received. If any of the parity error bits are asserted, the error correction unit generates a regenerated second global error correction code in the same manner in which the original second global error correction code is derived. Thus, in one embodiment, the regenerated second global error correction code is equivalent to the result of (or may be derived by) shifting the regenerated error correction code for a given ith group by i bit positions, wherein i=0 to X−1, and by XORing corresponding columns of the resulting shifted error correction codes together. A second global syndrome code is then generated by XORing the original second global error correction code with the regenerated second global error correction code. The error correction unit then uses the binary value of a row syndrome code derived from the second global syndrome code to determine the position of an error in any of the logical groups for which an error is indicated (pursuant to the corresponding parity error bits), and corrects the errors, if present. In alternative embodiments, the second global syndrome code (rather than the first syndrome code) is also used to determine the position of correctable errors when an odd number of the parity error bits is set.

In general, the first global syndrome code is generated such that it is indicative of situations in which two bit errors in different bit positions within the logical groups are present in the received data. In such situations, the first global error correction code is different from the regenerated first global error correction code. In the embodiment described above, if the first syndrome code is not an all zeros value when an even number of parity error bits is set, a double bit error is indicated. In other embodiments, other predetermined values of the first syndrome code may indicate a double bit error.

In addition, in general the second global syndrome code is generated such that, with knowledge of the specific logical groups that have a single bit error, a value indicative of the location of the error in such groups may be derived from the global syndrome code. The overall number of bits forming the global syndrome code and the parity bits for each logical group is smaller than the overall number of bits needed for the error correction codes individually associated with the logical groups.

The system accommodates the detection of arbitrary double-bit errors in the data block while performing correction of errors due to component failures. Advantageously, the overall number of required check bits (the parity bits for the logical groups and the bits forming the first and second global error correction codes) may be smaller than the overall number of bits needed to implement a system using extended Hamming codes.

BRIEF DESCRIPTION OF THE DRAWINGS

Other objects and advantages of the invention will become apparent upon reading the following detailed description and upon reference to the accompanying drawings in which:

FIG. 3 (prior art) is an illustration of bit positions and their content for a data block encoded by the parity generator of FIG. 1;

FIG. 4 (prior art) is an assignment table for generating a syndrome code;

FIG. 8A illustrates a manner in which a set of row parity error bits and a regenerated untwisted global error correction code may be generated;

FIG. 8B illustrates a manner in which an untwisted global syndrome code may be generated;

FIGS. 9A, 9B, 9C, 10A, 10B, 11A, 11B, 12A, 12B, 12C and 12D illustrate further examples of the generation of row parity error bits, untwisted global error correction codes, twisted global error correction codes, untwisted global syndrome codes, and twisted global syndrome codes;

Figure 24:
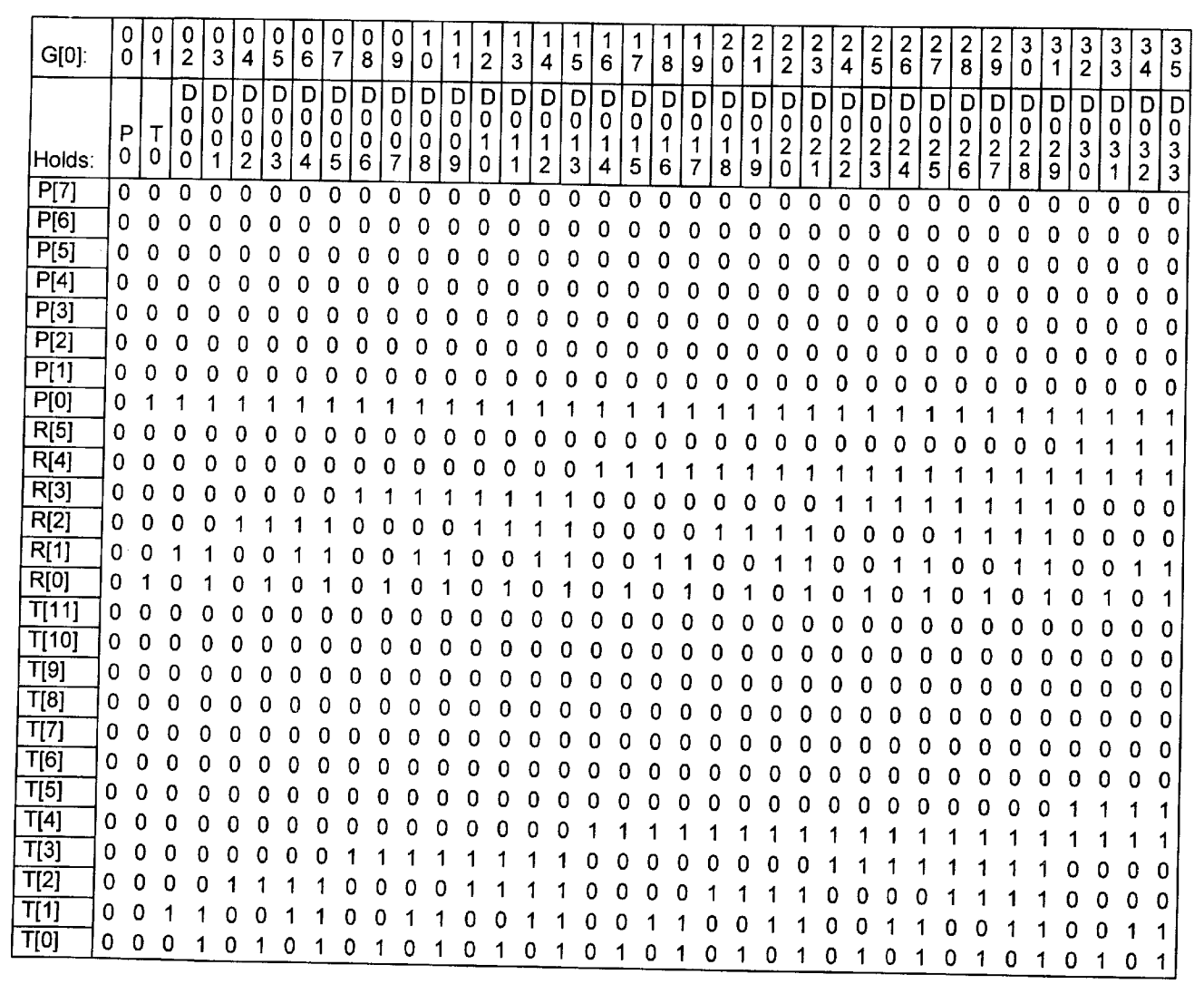
Figure 25:
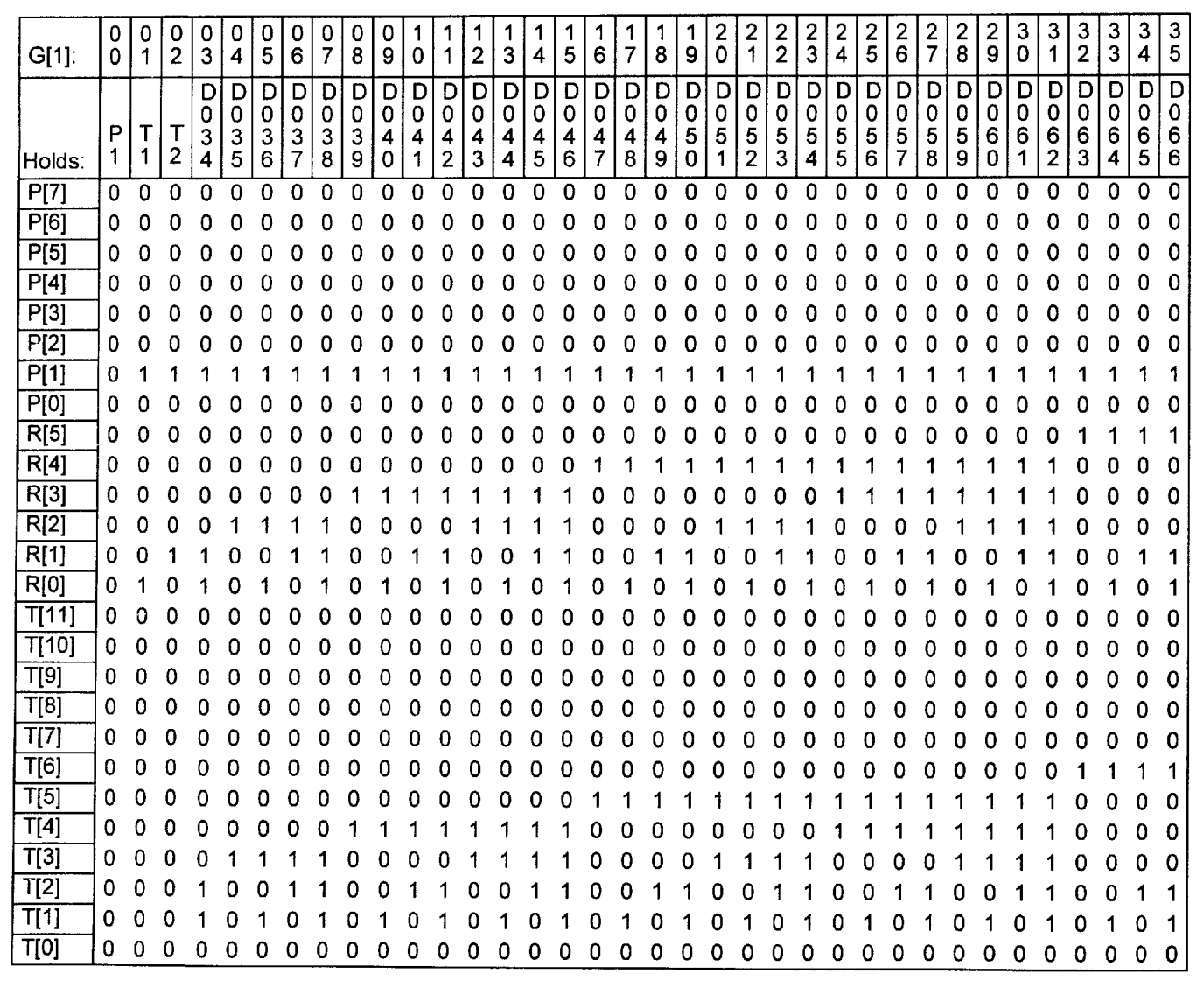
Figure 26:
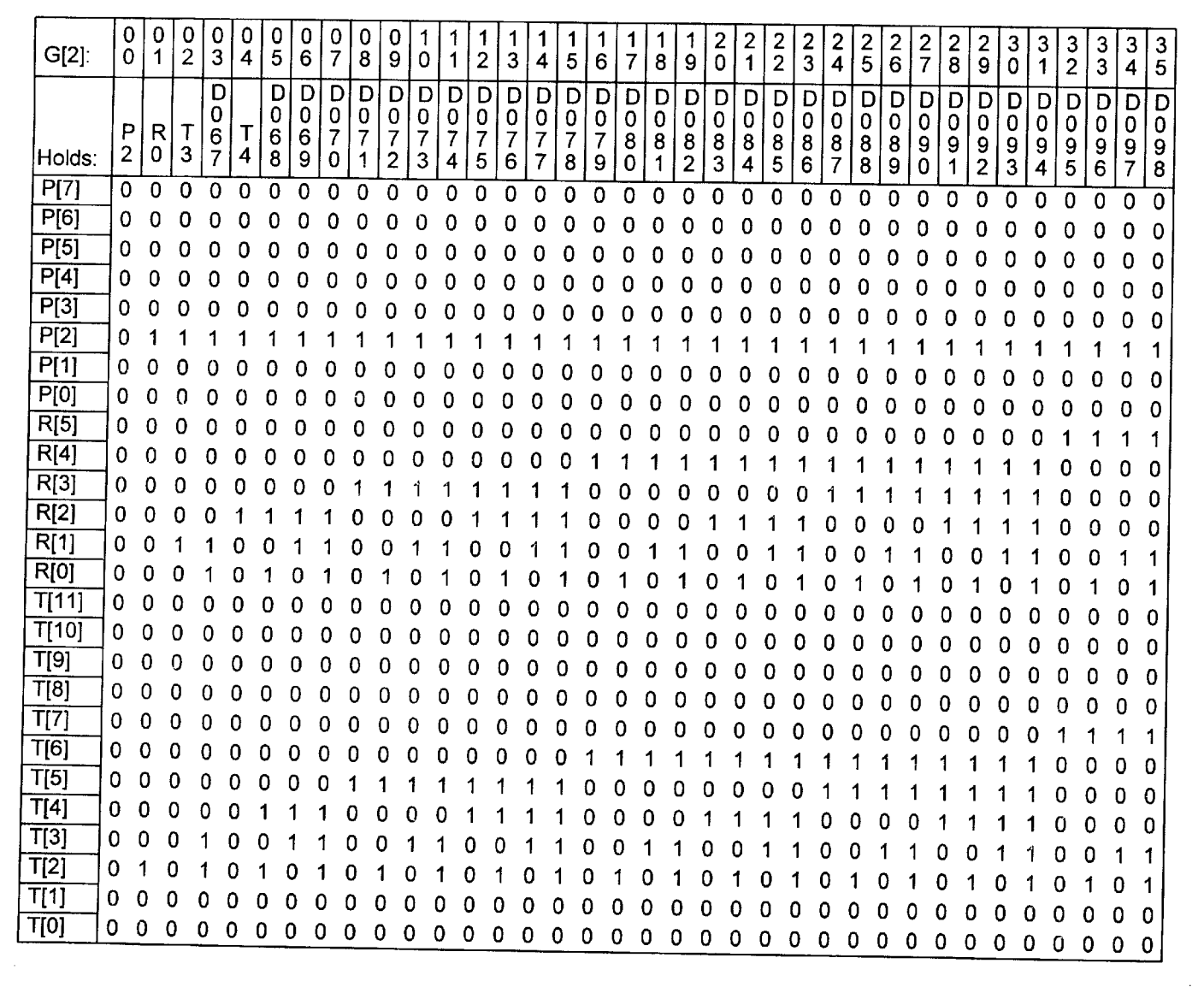
Figure 27:
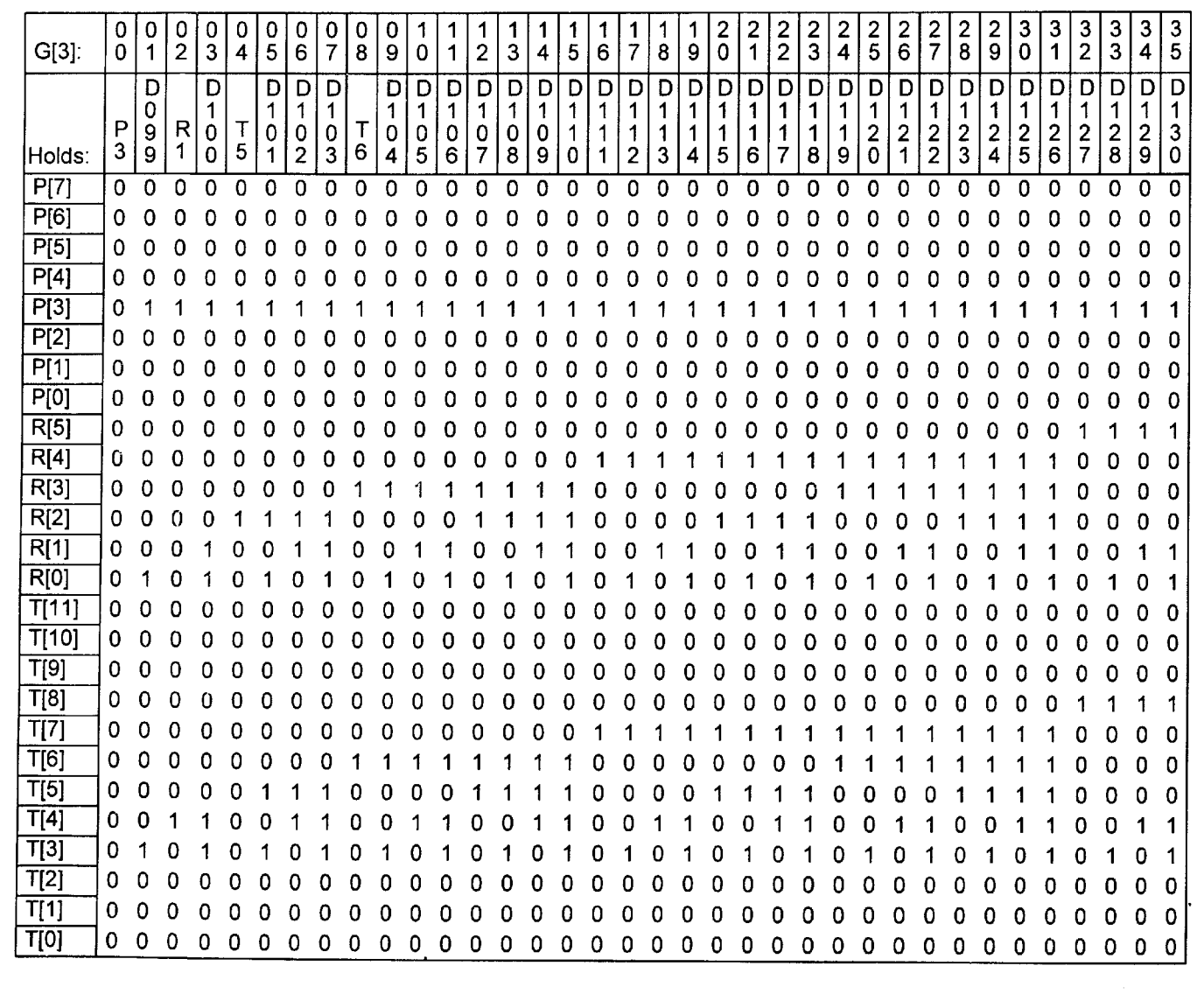
Figure 28:
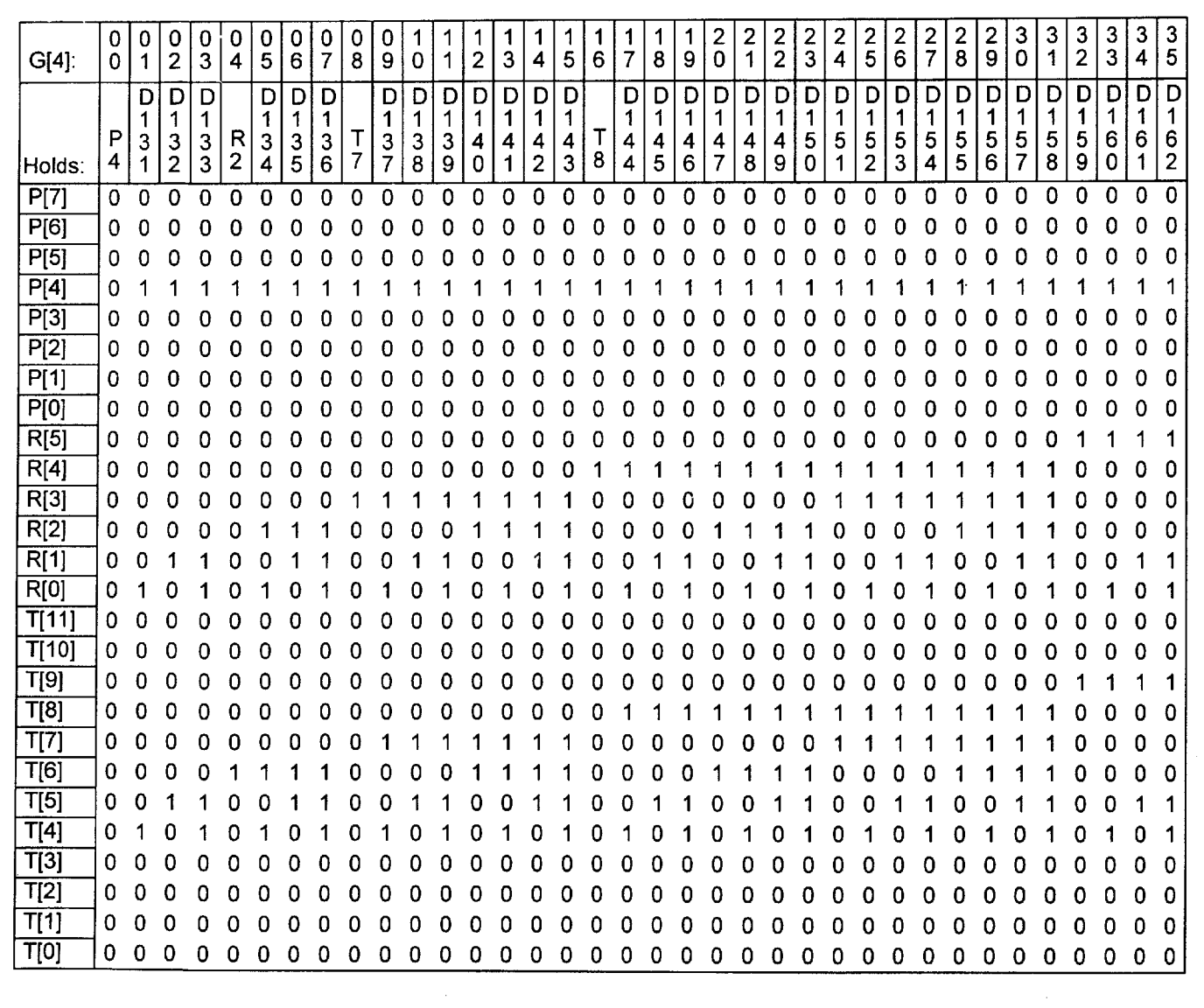
Figure 29:
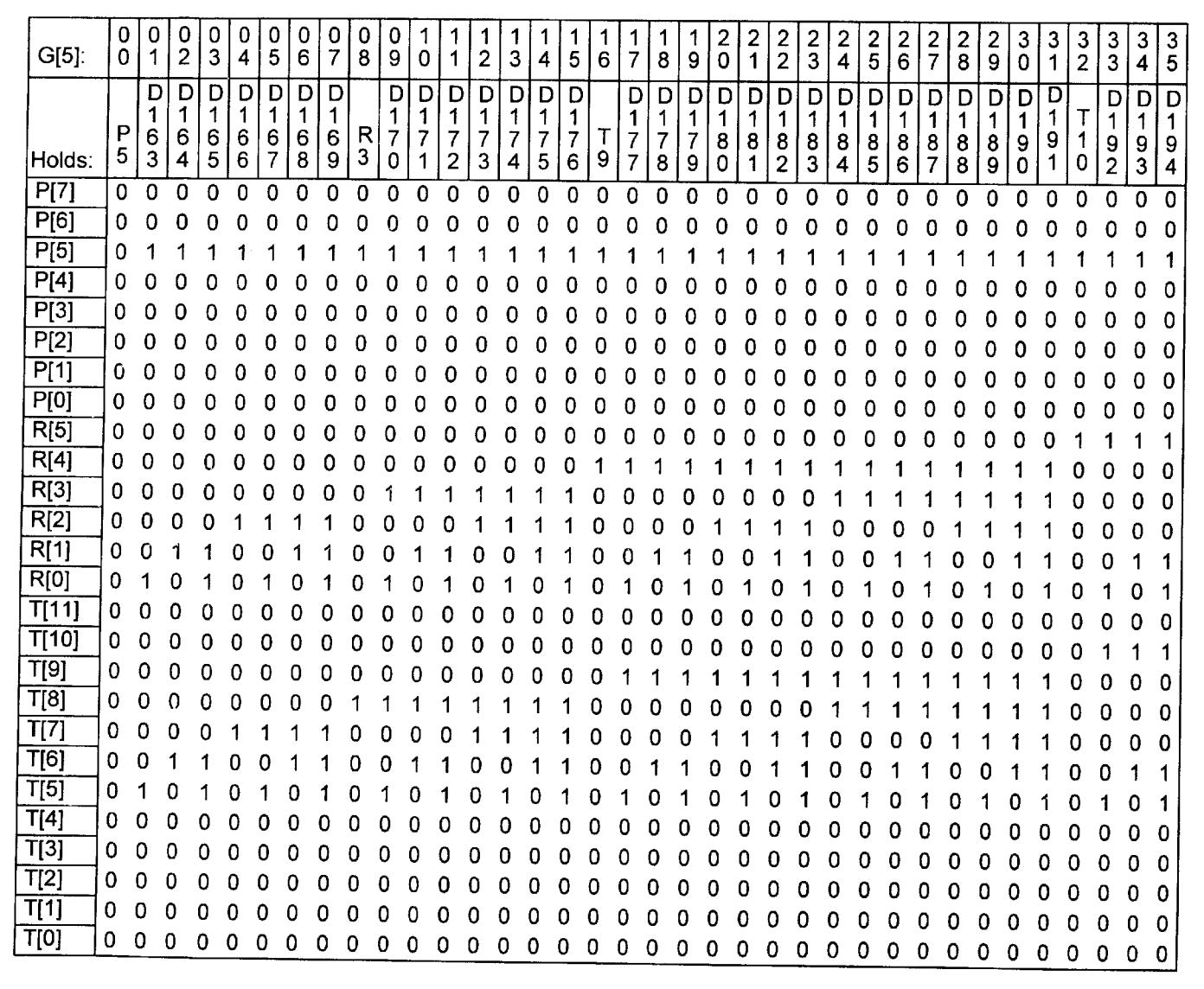
Figure 30:
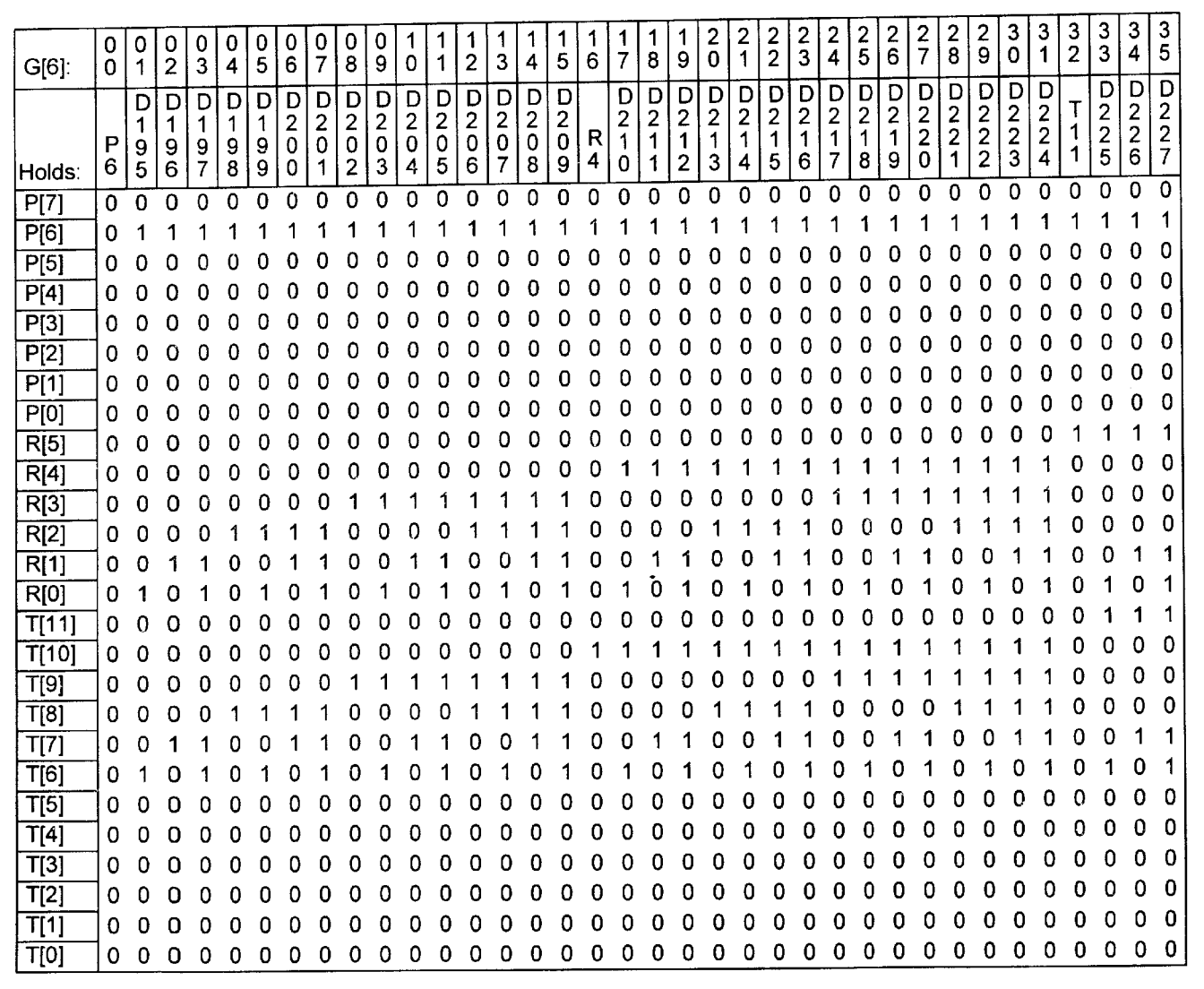
Figure 31:
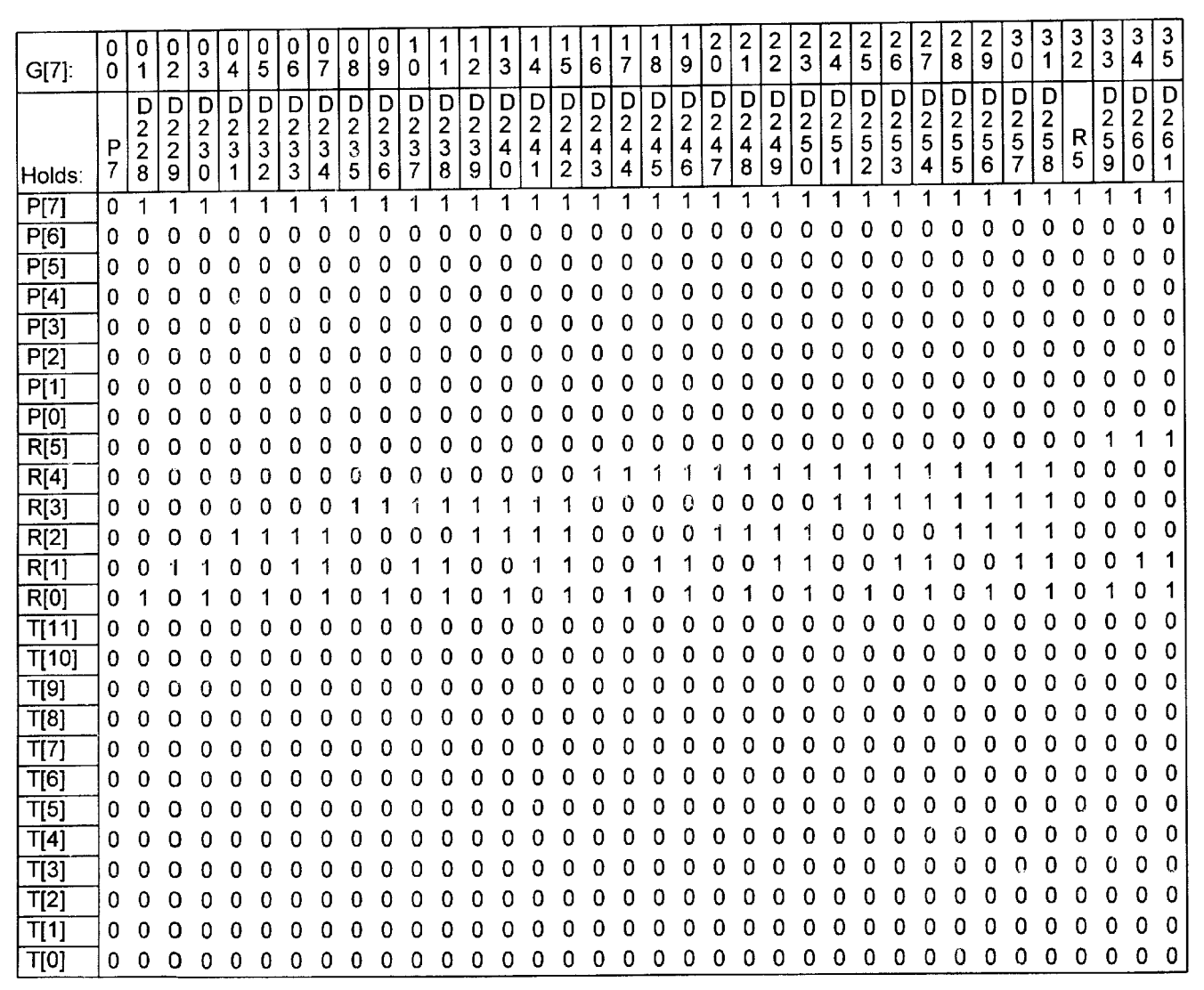

FIGS. 24–31 are assignment tables illustrating the operation of a set of check bits in accordance with another embodiment of the invention;

FIGS. 32–39 are assignment tables illustrating the generation of a set of row parity error bits and regenerated twisted check bits for the embodiment of FIGS. 20–27;

Figures 1, 2:
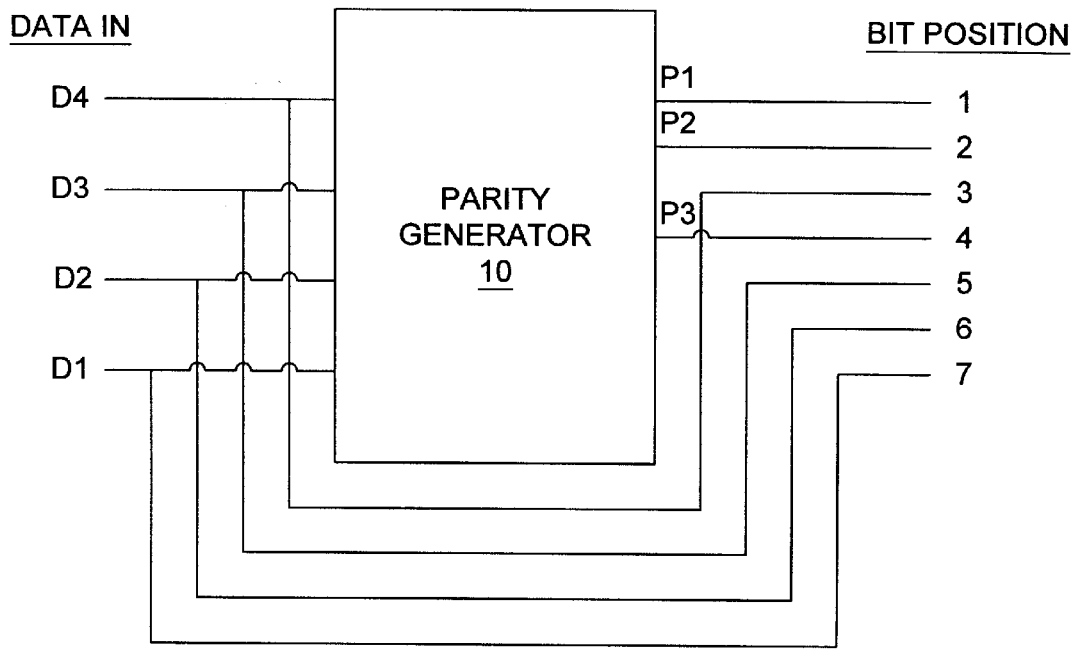
FIG. 1 (prior art) is a block diagram illustrating a parity generator to encode data bits using a single error correcting Hamming code.
FIG. 2 (prior art) is an assignment table to compute a set of check bits.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Figure 5:
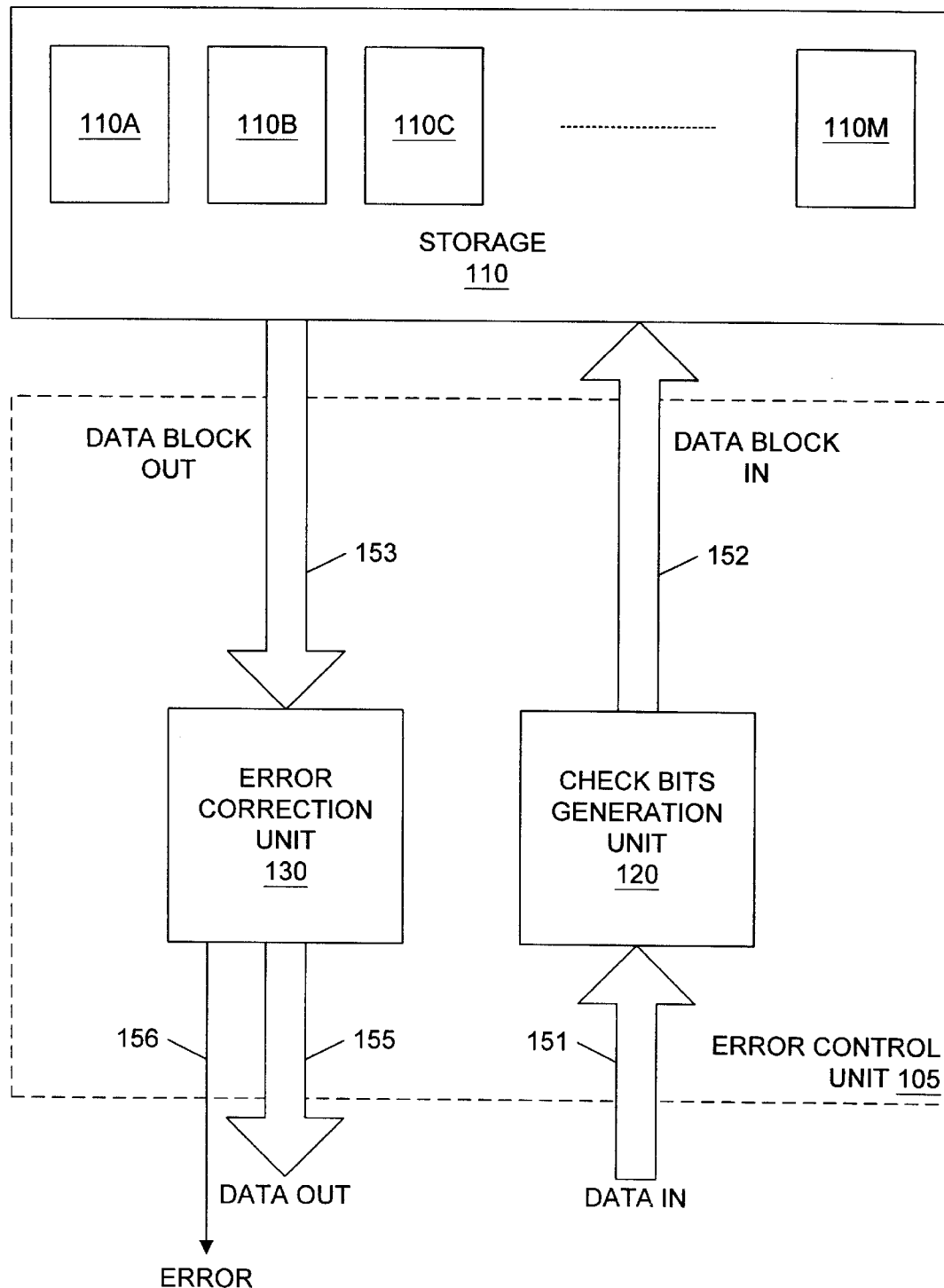
FIG. 5 is a block diagram of a system including an error control unit according to one embodiment of the present invention.

Turning now to FIG. 5, a block diagram of a system including an error control unit 105 is shown according to one embodiment of the present invention. In this particular embodiment, the error control unit 105 is coupled to convey and receive data from storage 110. The storage 110 is configured to store a data block (data bits and check bits) that is communicated from/to the error control unit 105. The storage 110 includes a plurality of memory chips 110A–110M. Each of the memory chips 110A–110M is configured to store a portion of the data block. The memory chips 110A–110M may be any type memory/storage devices usable to store data.

As will be described in further detail below, error control unit 105 is configured to encode data to be stored in the storage 110, and to decode received encoded data following storage to correct and/or detect certain categories of bit errors (when they occur) using a relatively small number of check bits as compared with traditional approaches.

The error control unit 105 includes a check bits generation unit 120 to perform the encoding process and an error correction unit 130 to perform the decoding process and to perform error correction. Data bits are received via data path 151 and are encoded by check bits generation unit 120 prior to storing a data block (data bits and check bits) into storage 110 via data path 152. Subsequently, the stored data block may be retrieved by error correction unit 130 via data path 153. Error correction unit 130 decodes the data block to detect and correct errors in the data. If one or more correctable errors are detected, the errors are corrected. The data bits (corrected, if necessary) are then output via data path 155. If an uncorrectable error is detected, an error signal is asserted at line 156.

It is noted that check bits generation unit 120 and error correction unit 130 may be implemented in hardware, in software, or using a combination thereof. Various specific implementations are possible.

The operation of error control unit 105 will next be explained with reference to FIGS. 5–8. FIGS. 6A–8B illustrate an example wherein a total of 20 data bits to be stored in storage 110 are protected.

Figure 6A:
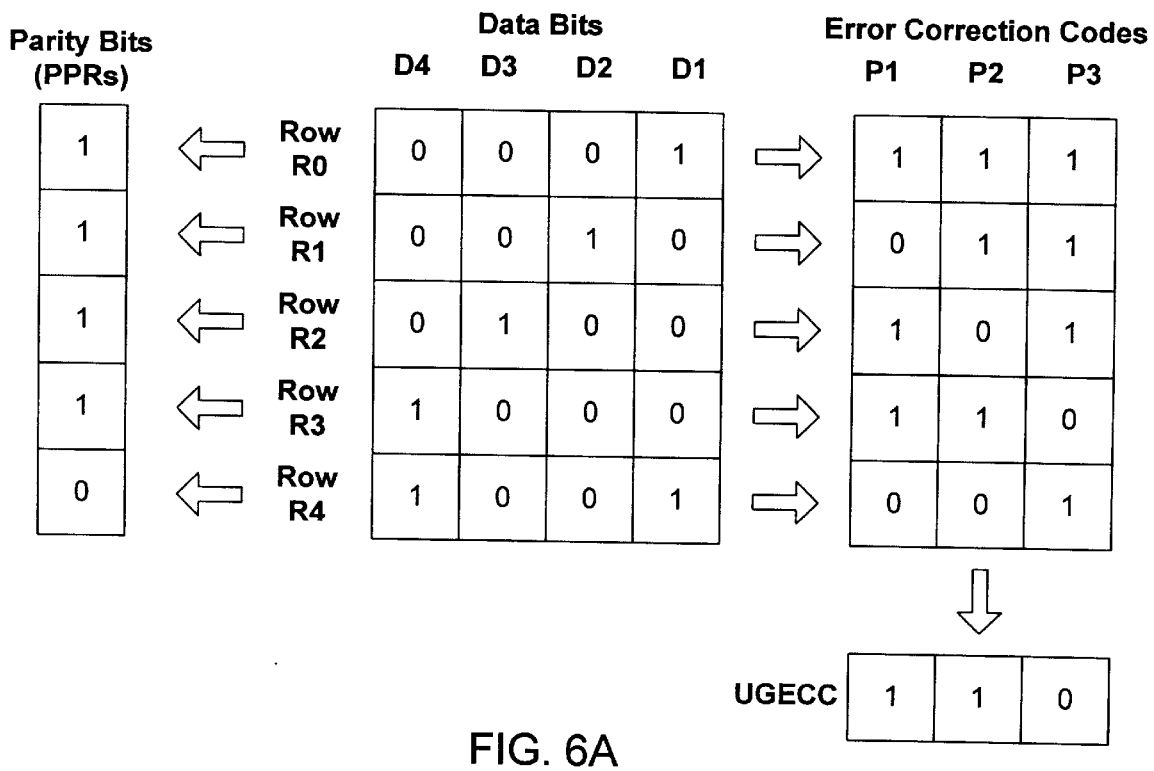
FIG. 6A illustrates an encoding process including the generation of row parity bits and row error correction codes.
Figure 6B:
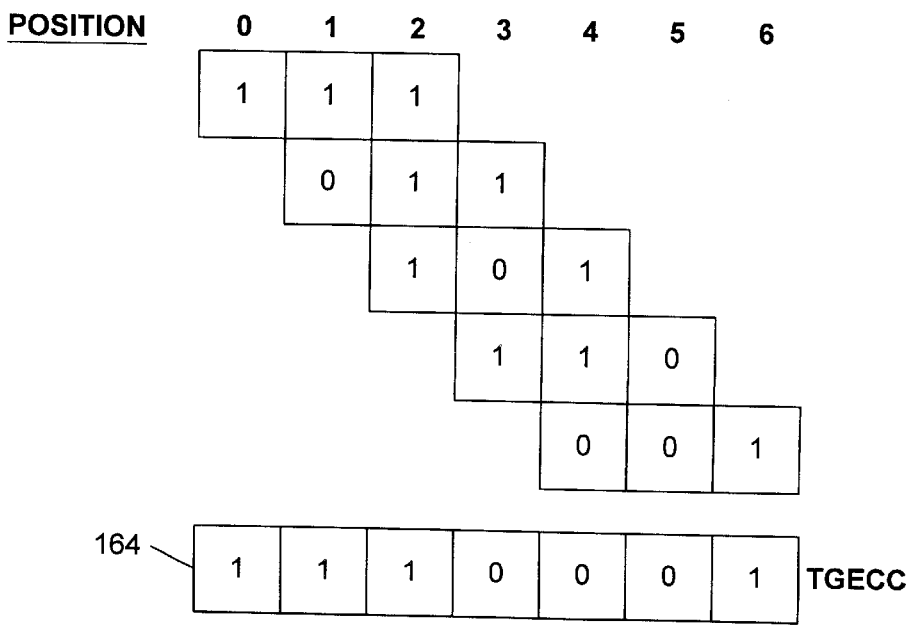
FIG. 6B illustrates a manner in which a global error correction code may be generated.

FIGS. 6A and 6B illustrate an encoding process performed by the check bits generation unit 120 prior to the storage of the data bits. Check bits generation unit 120 receives the 20 data bits (via data path 151) and, in this example, processes the data according to five logical groups, each group forming a respective row R0–R4, as shown in FIG. 6A. A set of columns denoted D4, D3, D2, and D1 is formed by corresponding bit positions of each row. As will be described in further detail below, the data forming each column is stored in the same memory chip, and different bits of each row are stored in different memory chips.

Check bits generation unit 120 is configured to generate a parity bit (PPR) for each of the rows. The set of parity bits may be calculated using either even or odd parity. Since one parity bit is calculated per row, or logical group, the number of PPR bits equals the number of rows. In the example of FIG. 6A, even parity is used. Thus, for the exemplary data as illustrated, each of the parity bits (PPRs) for rows R0–R3 is 1. The parity bit for row R4 is 0.

Check bits generation unit 120 is further configured to generate a first global error correction code and a second error correction code. Generally speaking, the first global error correction code is equivalent to, or may be derived from, a first predetermined logical combination of error correction codes each individually associated with a respective row. Similarly, the second global error correction code is equivalent to, or may be derived from, a second predetermined logical combination of error correction codes each individually associated with the respective row.

FIGS. 6A and 6B illustrate a particular manner in which the first and second global error correction codes may be generated by check bits generation unit 120. It is noted that the first and second global error correction codes may be generated differently in other embodiments.

FIG. 6A illustrates an error correction code (ECC) associated with each row. In the example of FIG. 6A, the error correction code for each row is calculated according to the assignment table shown in FIG. 2. For example, the error correction code calculated for the data in row R0 is [111], and the error correction code calculated for row R1 is [011], and so on. It is noted, however, that other specific error correction coding techniques may be employed for the individual rows, and that different error correction coding techniques may be associated with differing rows.

As illustrated in FIG. 6A, in this embodiment the first global error correction code is equivalent to the result of XORing the collection of individual error correction codes together. The first global error correction code in this embodiment is referred to as an "untwisted" global error correction code (UGECC), due to the fact that each bit of the UGECC is equivalent to or is derived from a combination of aligned (and unshifted) corresponding bits of the individual error correction codes.

As illustrated in FIG. 6B, in this embodiment the second global error correction code is generated by selectively shifting certain row ECCs with respect to one another and XORing the resulting vertically aligned bits. Since some of the row ECCs are shifted more than others, the bits forming the second global error correction code are referred to as "twisted" check bits, and the second global error correction code is referred to as a "twisted" global error correction code (TGECC). In the embodiment of FIG. 6B, the second global error correction code is derived by linearly shifting the error correction code for a given ith group by i bit positions wherein i=0 to X–1, and where X is the total number of rows or logical groups. The bits in each resulting vertically aligned column are then XORed together, to thereby generate the global error correction code (leading or trailing 0s may be added to the entries of each row of the twisted ECCs, as necessary, prior to this XOR operation).

It is noted that while the first and second global error correction codes may be calculated by first generating the individual error correction codes for each row, in other embodiments, the first and second global error correction codes may be generated directly from the data bits (i.e., without generating individual correction codes for each row). For example, the first and second global error correction codes illustrated in FIGS. 6A and 6B could be generated directly from the data bits using predetermined functions, without generating individual error correction codes for each row.

Upon calculation of the untwisted and twisted global error correction codes (UGECC and TGECC), the data block including 20 bits of data, the parity bits (PPRs) and the global error correction codes are conveyed to storage 110. It is noted that the bits forming each column (D4, D3, D2, and D1) of data in the data block are stored in a common memory chip, and that no two data bits in differing bit positions of a particular row are stored in the same memory chip. It is further noted that the parity bits and untwisted and twisted global error correction codes may be stored in additional memory chips. A further example of the manner in which the parity bits and the bits forming the untwisted and twisted global error correction codes may be distributed for storage within various memory chips will be provided further below in conjunction with FIGS. 22–37.

It is further noted that in the example of FIGS. 6A and 6B, a total of 15 check bits (the parity bits (PPRs) and the bits of the first and second global error correction code) are generated for storage along with the 20 data bits. This overall number of check bits is advantageously less than the number of check bits may be required using conventional methods.

Figure 7A:
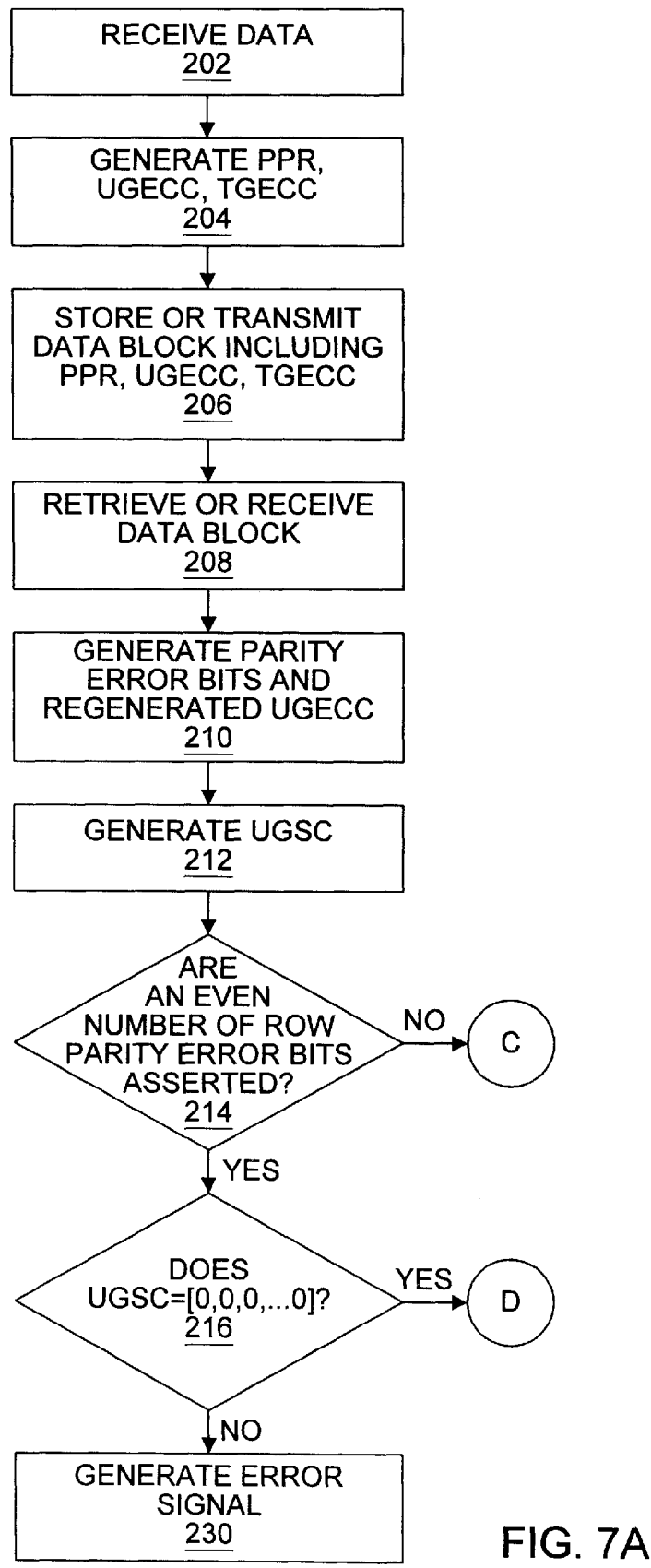
FIGS. 7A and 7B collectively form a flow diagram depicting operation of one embodiment of an error correction system.

Referring now to FIGS. 7A–13B, the decoding process of the data block following storage will next be explained. FIGS. 7A and 7B collectively form a flow diagram depicting operation of the error correction system. As illustrated in FIG. 7A, after check bits generation unit 120 receives data during step 202, generates the parity bits (PPRs) and the first and second global error correction codes (UGECC and TGECC) during step 204, and stores or transmits the data block upon step 206, the data block is retrieved or received by error correction unit 130 (step 208). At this point, the decoding process begins.

As illustrated in FIG. 8A, error correction unit 130 processes the data according to the same logical groups as formed by check bits generation unit 120. Error correction unit 130 may be configured to generate a regenerated parity bit per row (PPR') using the received data. The same parity type (even or odd) is used during both encoding and decoding. In the example of FIG. 8A, three errors are introduced into the received data set, all occurring in column D2, as shown with underlines in rows R0, R1 and R3 (i.e., the bits in rows R0, R1 and R3 of column D2 have been changed to exemplify errors). Such errors could be the result of, for example, a faulty memory chip that stores the column D2 bits of the data set. Thus, for this example, the regenerated parity bits for rows R0, R1 and R3 change state. A bit for each row indicating that a parity error exists, referred to as a row parity error bit (RPE), may be generated by XORing the original parity bits with the regenerated parity bits (step 210). It is noted that generation of the row parity error bits (RPEs) may instead be generated directly by XORing corresponding bits of the received data bits with the original parity bits (PPRs) (without separately generating the regenerated parity bits (PPRs)). The row parity error bits RPEs illustrated in FIG. 8A reflect the single bit errors in rows R0, R1 and R3.

Error correction unit 130 also generates a regenerated first global error correction code in the same manner in which the original first global error correction code was generated, using the received data bits. Thus, as illustrated in FIG. 8A, in the depicted embodiment the regenerated first global error correction code is equivalent to the result of XORing a set of individual error correction codes based on the received data bits. The regenerated first global error correction code in this embodiment is referred to as the regenerated untwisted global error correction code (or the regenerated UGECC).

Error correction unit 130 subsequently generates a first global syndrome code based upon the original first global error correction code and the regenerated first global error correction code during step 212. In one embodiment, as illustrated in FIG. 8B, the first global syndrome code is generated by an exclusive OR of the original UGECC and the regenerated UGECC. This first global syndrome code is thus referred to as an "untwisted" global syndrome code (UGSC).

At step 214 of FIG. 7A, error correction unit 130 determines whether an even number or an odd number of row parity error bits (RPEs) is asserted. For the example illustrated in FIG. 8A, since a total of three row parity error bits is asserted (an odd number), the error correction unit 130 uses the binary value of the untwisted global syndrome code UGSC (taken in reverse order with respect to the depicted value in FIG. 8B) to determine the position of an error in any of the logical groups (e.g., any rows) that have errors, pursuant to the row parity error bits. Therefore, in this example, the untwisted global syndrome code has a value of "110" (read backwards), which is binary six. This value correlates to the bit position D2, as illustrated in FIG. 3, which corresponds to the position of the errors introduced in the example of FIG. 8A.

Upon determination of the erroneous bits in the received data set, the error correction unit 230 is configured to correct the data bits, as needed (step 213). For example, in the example of FIG. 8A, the bits in column D2 of rows R0, R1, and R3 are identified as being erroneous. Accordingly, error correction unit 230 inverts these bits and accepts or outputs the data as corrected via data output 155 (step 217).

Figure 9A:
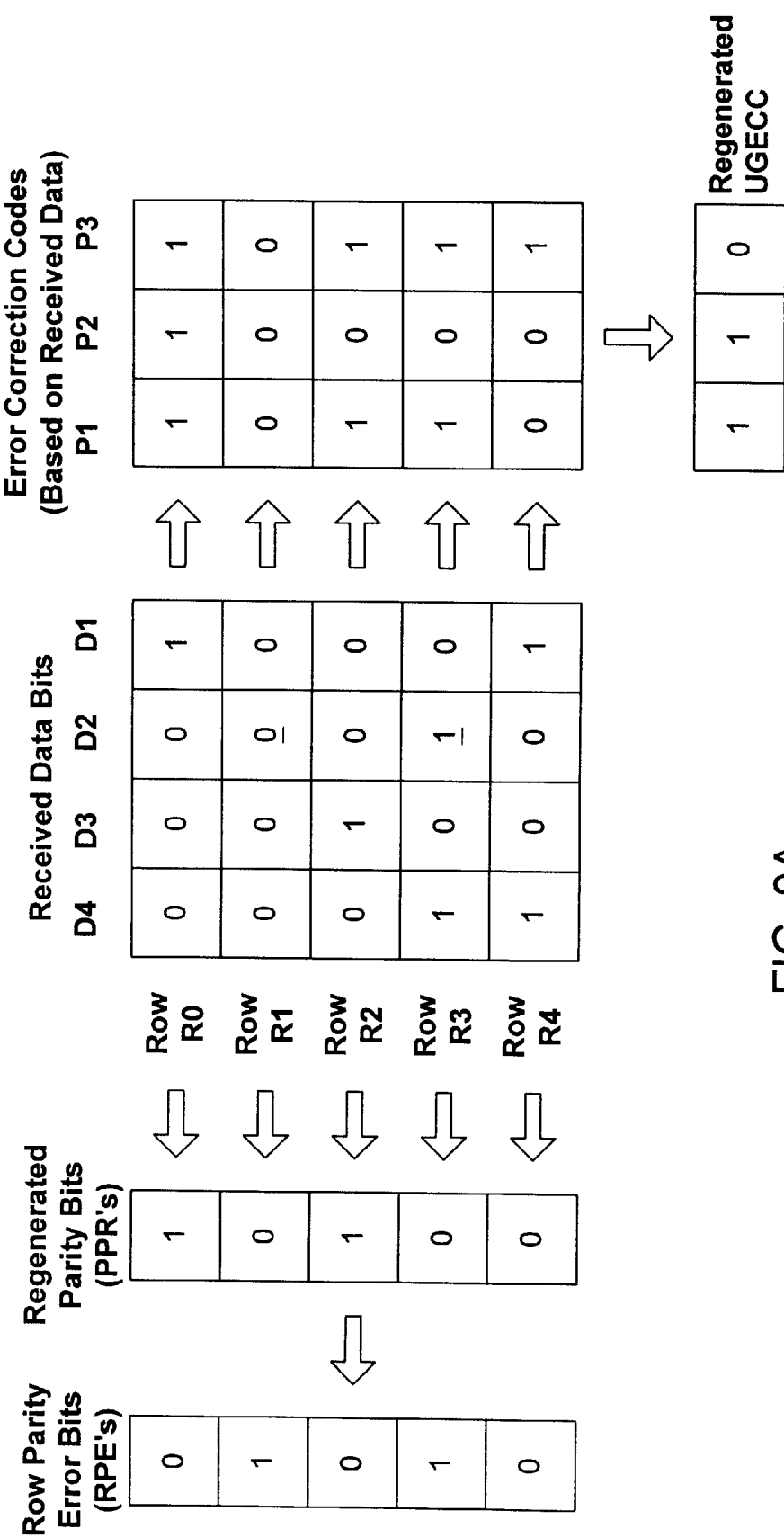
Figure 9B:
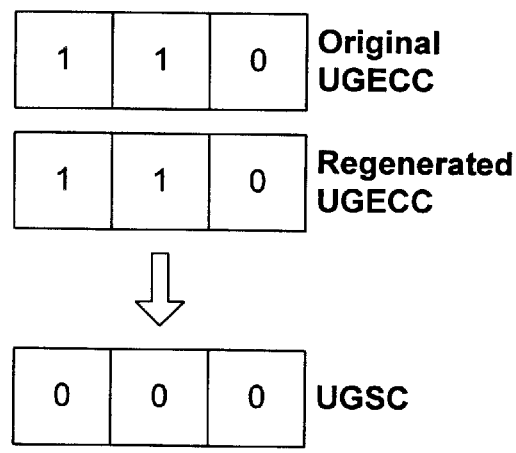

FIG. 9A illustrates a similar example in which two errors (rather than three) are introduced into the received data set, both occurring in column D2, as shown with underlines in rows R1 and R3. In this situation, error correction unit 130 again generates a set of row parity error bits (RPEs) and a regenerated "untwisted" global error correction code (regenerated UGECC) during step 210. As illustrated in FIG. 9B, error correction unit 130 also generates an untwisted global syndrome code (UGSC) by XORing the original UGECC with the regenerated UGECC (step 212). In this example, the generated "untwisted" global syndrome code (UGSC) is all zeros.

Figure 9C:
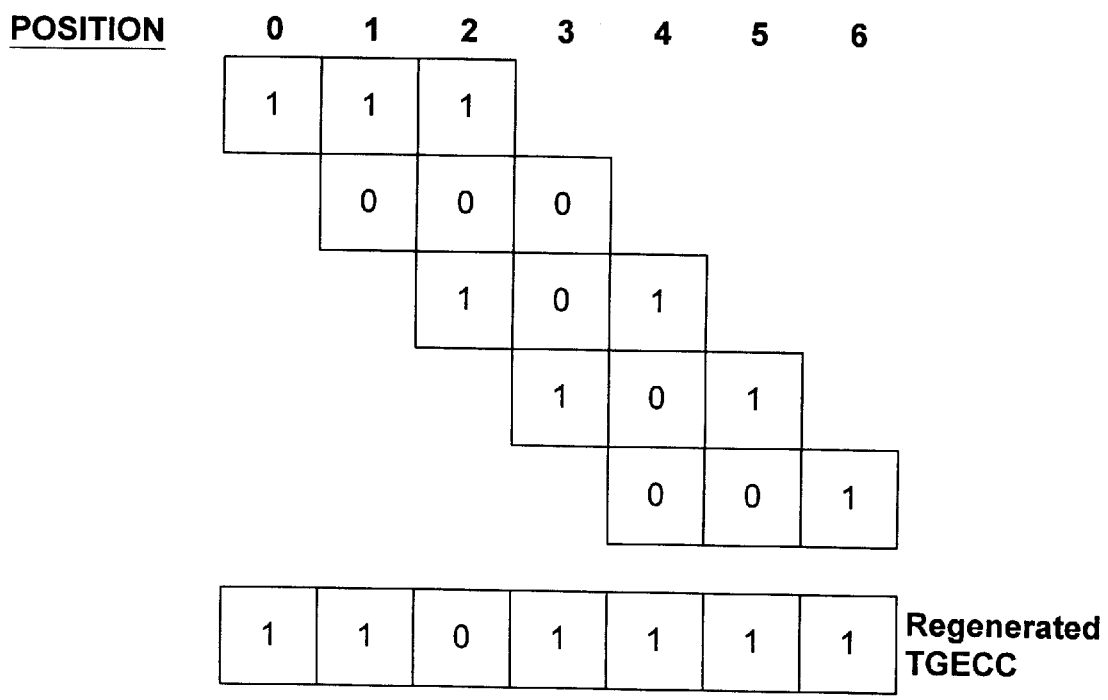

Since in the example of FIG. 9A, an even number of row parity error bits is asserted (step 214), the error correction unit 130 determines whether the untwisted global syndrome code (UGSC) is an all zeros value (step 216). As illustrated in FIG. 9B, since the UGSC is an all zeros value, the error correction unit 130 subsequently determines whether any of the row error parity bits (RPEs) are asserted (step 220). In this example, the row parity error bits for rows R1 and R3 are asserted. Thus, the error correction unit 130 generates a regenerated second global error correction code in the same manner in which the original second global error correction code was generated, using the received data bits. Thus, in this embodiment, a regenerated twisted global error correction code is generated (step 222) by shifting the error correction code for a given ith group by i bit positions, where i=0–X–1, and by XORing the bits in the resulting vertically aligned columns, as depicted in FIG. 9C. Similar to the previous discussion, in other embodiments, the regenerated twisted global error correction code may be derived directly from a predetermined function of the received data bits, without generating an individual error correction code for each row. In such embodiments, however, the twisted global error correction code is equivalent to a predetermined combination of a set of error correction codes each individually associated with a corresponding row.

Figure 10A:
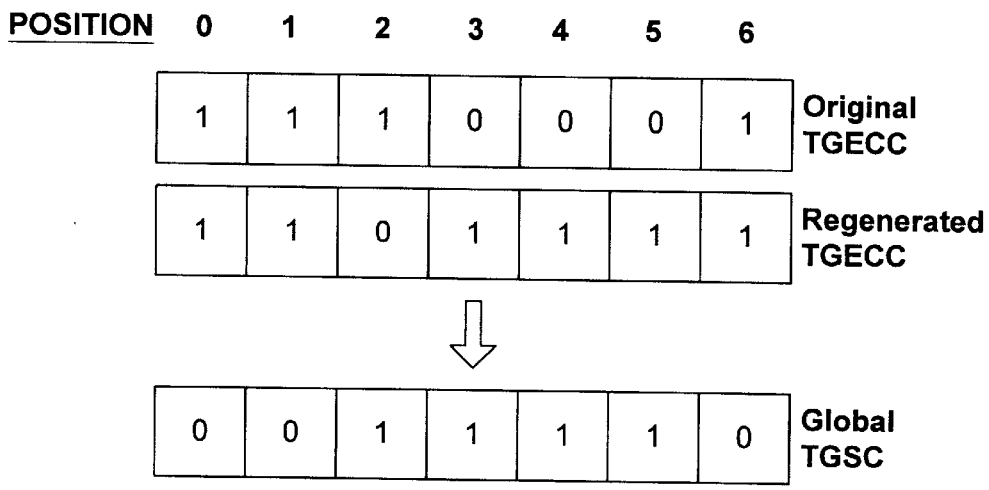

As shown in FIG. 10A, upon generation of the regenerated twisted global error correction code (the regenerated TGECC), a second global syndrome code may be generated by XORing the original second global error correction code with the regenerated second global error correction code (step 224). In this embodiment, the second global syndrome code is referred to as a twisted global syndrome code (TGSC). The second global syndrome code is indicative of a difference between the original second global error correction code and the regenerated second global error correction code. In embodiments in which the error correction codes for various logical groups are effectively shifted in a twisted manner and are XORed, the second global syndrome code includes a bit corresponding to each aligned column of the regenerated shifted error correction codes which indicates whether a parity error for that column exists. For instance, in the example of FIG. 10A, the bits in the twisted global syndrome code (TGSC) for positions 2, 3, 4 and 5 are set. This is the result of the fact that the parity in each of columns 2, 3, 4 and 5 of the shifted regenerated error correction codes of FIG. 9C is different from the parity of each of the corresponding columns of the original shifted error correction codes, as depicted in FIG. 6B. Accordingly, in this embodiment the twisted global syndrome code includes a bit corresponding to each aligned column of the regenerated shifted error correction codes which indicates whether a parity error for that column exists. Since the regenerated error correction codes for the logical groups that have errors (assuming the untwisted global syndrome code is an all-zeros value) will incur changes at exactly the same bit positions, by shifting in a twisted manner the various error correction codes and XORing the resulting bit aligned columns, the correlation that exists with respect to changes in the error correction codes for logical groups that have errors may be exploited to thereby extract information indicating the specific positions of the errors.

Figure 10B:
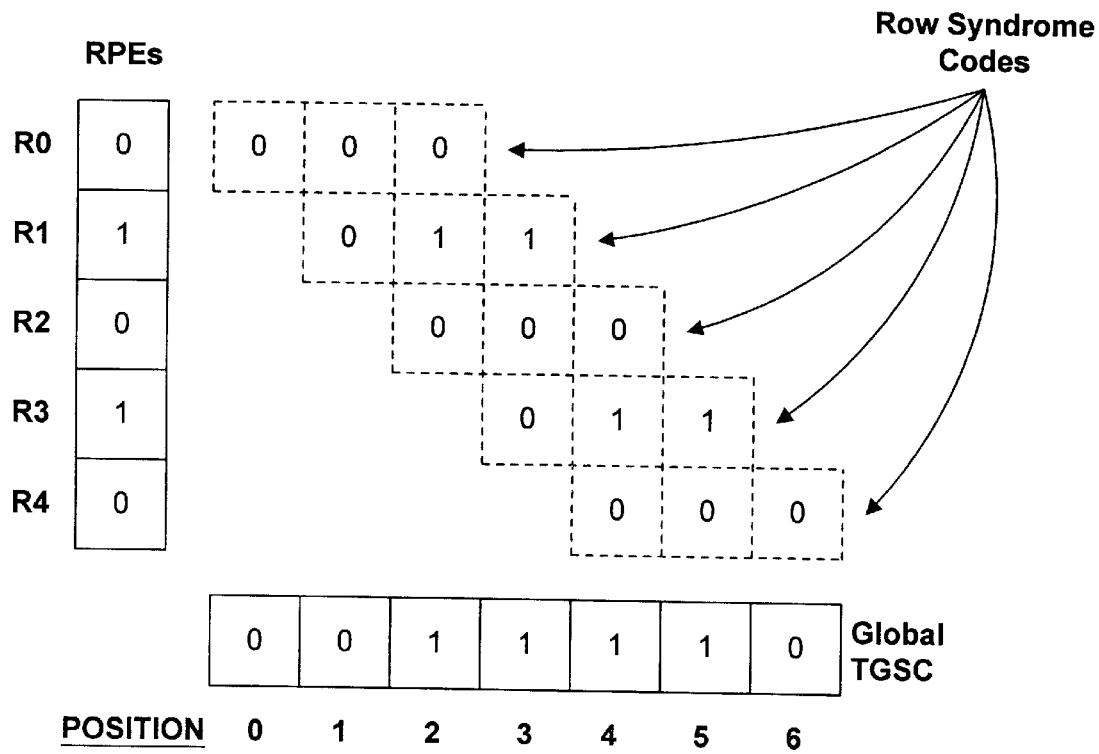

For example, FIG. 10B illustrates a manner in which a set of row syndrome codes, each of which is indicative of the position of an error in a given row, may be generated using the twisted global syndrome code and the row parity error information (step 226). As illustrated in FIG. 10B, entries (initially unfilled) for each row syndrome code are provided by shifting the entries in the same manner in which the error correction codes were shifted to generate the twisted global error correction code. First, the row syndrome codes for any rows that do not have errors can be filled in with all "0" values (since rows without errors could not contribute to a parity error in any given column, as identified by the twisted global syndrome code). Thus, the row syndrome code entries for rows R0, R2, and R4 can be filled in with all "0" values. As depicted in FIG. 10B, the first row with an error is row R1. Since the first bit of the row syndrome code for row R1 is in column position 1, and since the global syndrome value for that bit position is 0 and the only other contributing value for that bit position of the twisted global syndrome code is derived from the row syndrome code for row R0 (which is already known to be "0"), the value of the first bit of the row syndrome code for row R1 can be filled in as "0". Additionally, since the row syndrome code for every row with an error is known to be identical, the first bit of the row syndrome code for row R3 can also be filled in as a "0". Subsequently, the second bit of the syndrome code for row R1 may be similarly determined by considering the value in bit position 2 of the global syndrome, and the values of the bits in position 2 of rows 0 and 2 (i.e., the last bit of the row syndrome code for row R0 and the first bit of the row syndrome code for row R2). In this situation, the value of the second bit of the row syndrome code for row R1 may be filled in as a "1". Again, this value is also reflected in the second bit of the row syndrome code for row R3 The last bit of the row syndrome codes may be determined similarly.

The binary value of the row syndrome codes (taken in reverse order with respect to the depicted values in FIG. 10B) indicates the position of the error for logical groups that have errors. Therefore, in this example, the value "110", which is binary 6, correlates to bit position D2, as shown in FIG. 3. This position corresponds to the position of the errors introduced in the example shown in FIG. 9A.

Upon determination of the erroneous bits in the received data set, the error correction unit 230 is configured to correct the data, as needed. For example, in the example of FIG. 9A, the bits in column D2 of the rows R1 and R3 are identified as being erroneous. Accordingly, error correction unit 230 inverts these bits and outputs the data as corrected via data output 155.

Figures 11A, 11B:

FIG. 11A illustrates a further example in which two errors are introduced into a single logical group (i.e., row). More particularly, in FIG. 11A, the bits in positions D3 and D2 of row R1 have errors. In this case, all of the row parity error bits are zero, since the double-bit error occurs in the same row R1. In addition, in this case, the regenerated untwisted global error correction code is "000". As illustrated in FIG. 11B, after the untwisted global syndrome code is generated during step 212, the error correction unit 130 determines that an even number (0) of row parity error bits is asserted in this case, during step 214. Thus, the error correction unit 130 determines whether the untwisted global syndrome code an all-zeros value, as depicted in FIG. 11B, since the untwisted global syndrome code is not an all-zeros value, an error signal is generated during step 230 to indicate the existence of the double-bit error.

Figure 12A:
Figure 12B:

FIG. 12A illustrates another example in which a double-bit error is introduced, one appearing in column D2 of row R0 and the other appearing at column D4 of row R4. As illustrated in this example, the row parity error bits for rows R0 and R4 are set. Additionally, the regenerated untwisted global error correction code is "010". Since an even number of row parity error bits is asserted (step 214), the error correction unit 130 determines whether the untwisted global syndrome code is an all-zeros value. As illustrated in FIG. 12B, since the untwisted global syndrome code is not an all-zeros value, the error correction unit 130 generates an error signal during step 230 to indicate the presence of the double-bit error.

Turning finally to FIG. 12C, an example is illustrated wherein no errors are introduced into the data set. Thus, in this example, none of the row parity error bits are set, and the regenerated untwisted global error correction code is "110". As illustrated in FIG. 12D, the untwisted global syndrome code is therefore "000". Since the error correction unit 130 determines that an even number of row parity error bits is asserted during step 214, the error correction unit 130 determines whether any of the row parity error bits are set during step 220. Since in this case, none are set, the error correction unit 130 accepts the data as being correct.

Figure 13:
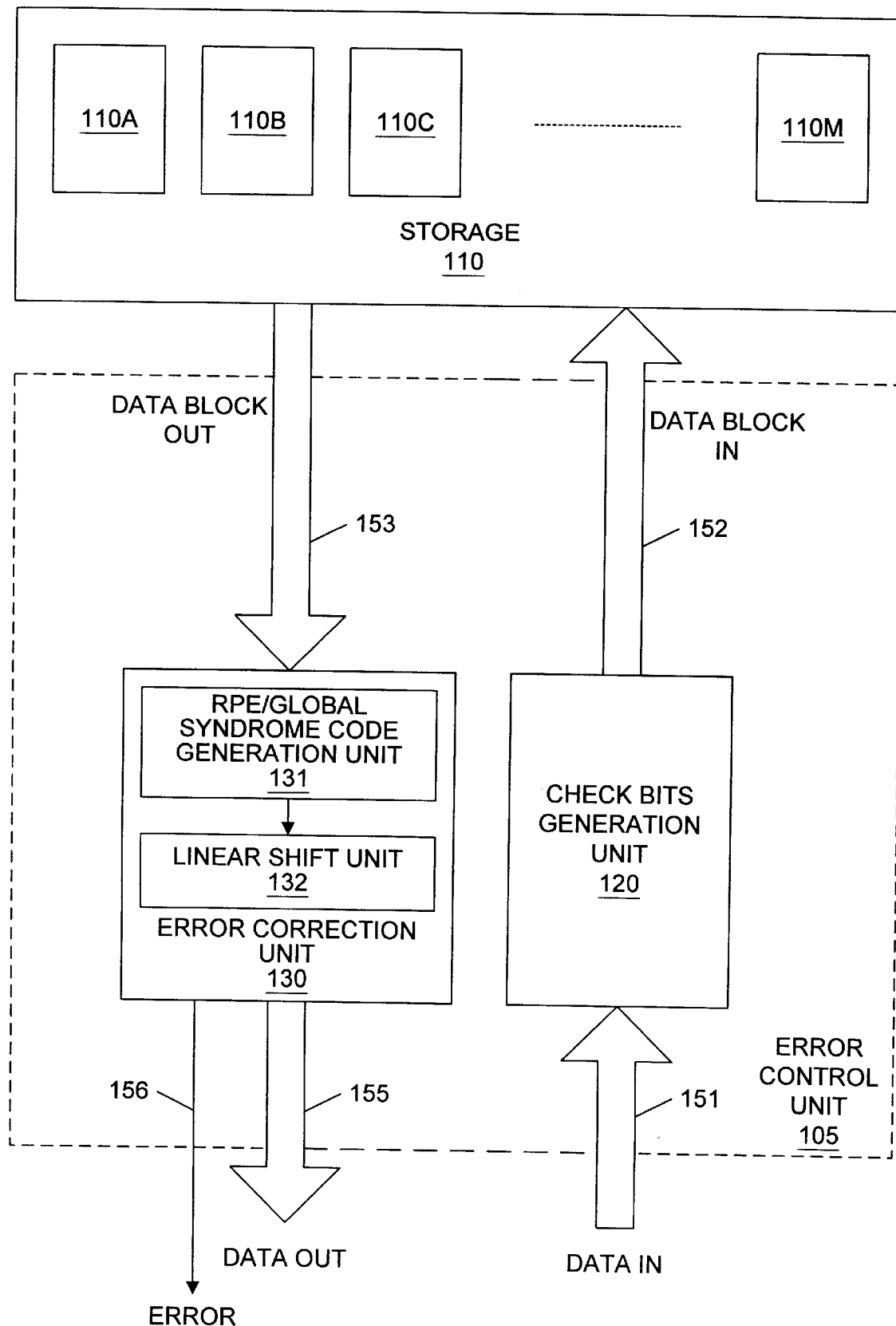
FIG. 13 is a block diagram of a system including a linear shift unit for decoding a data block.
Figure 14:
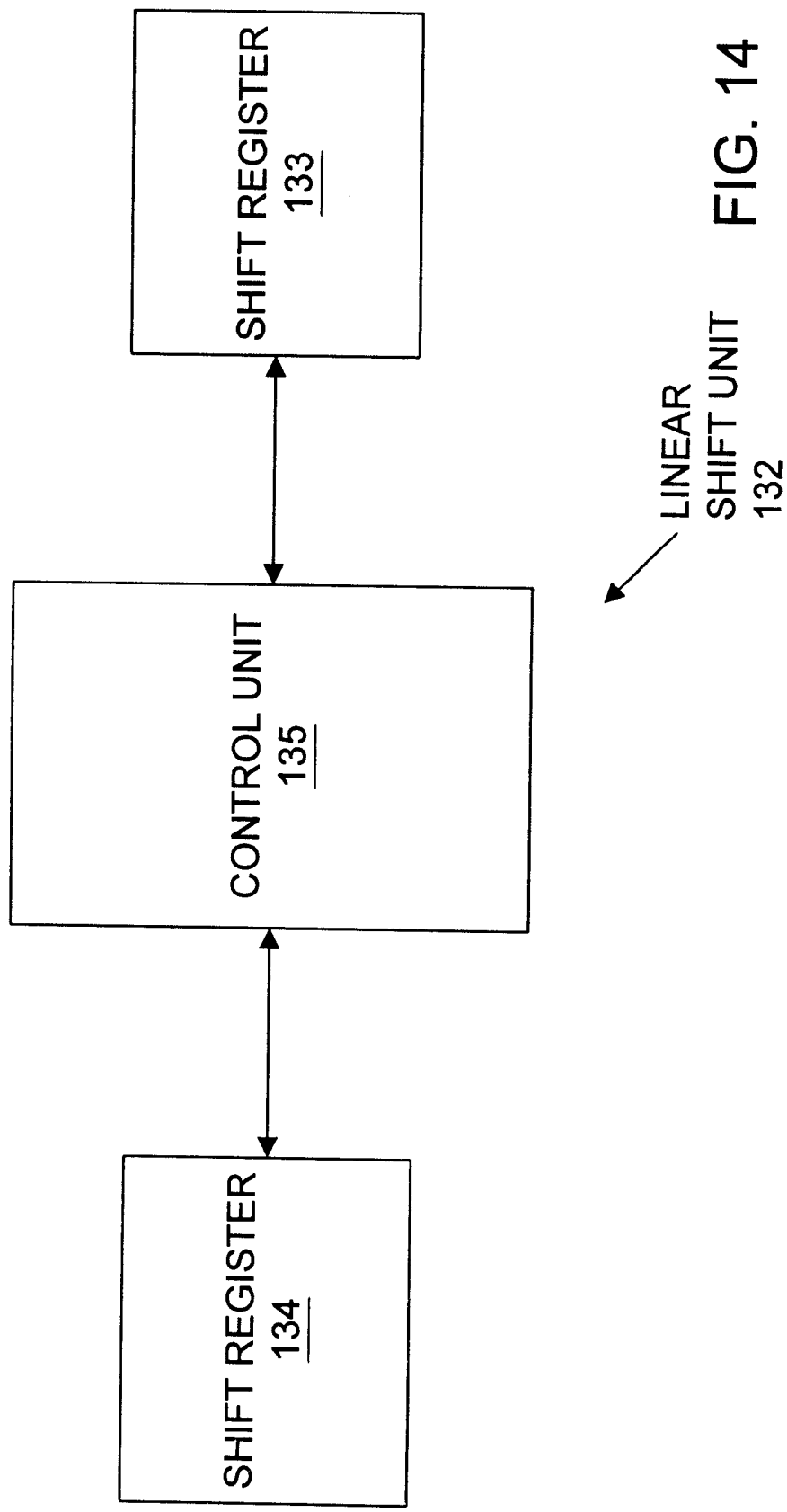
FIG. 14 is a functional block diagram of a linear shift unit.

Turning next to FIGS. 13–23, a manner in which the row parity information and the twisted global syndrome code may be decoded to generate the row syndrome code is next considered. More particularly, as illustrated in FIG. 13, error correction unit 130 may employ an RPE/global syndrome code generation unit 131 and a linear shift unit 132 for decoding a received data block which is encoded using the linear shifting methodology as described above. A functional block diagram illustrating functional aspects of the linear shift unit 132 is illustrated in FIG. 14. As shown, linear shift unit 132 includes a control unit 135 coupled to a pair of shift registers 133 and 134. The various functionality illustrated in FIGS. 13 and 14 may be implemented in hardware, in software, or using a combination thereof.

The RPE/global syndrome code generation unit 131 generates the row parity error bits (RPEs), the untwisted global syndrome code (UGSC) and the twisted global syndrome code (TGSC) in accordance with the foregoing description using the received data block. If an even number of the row parity error bits (RPEs) is set, the row parity error bits and the global syndrome code are provided to the linear shift unit 132 to determine the row syndrome code.

Figure 15:
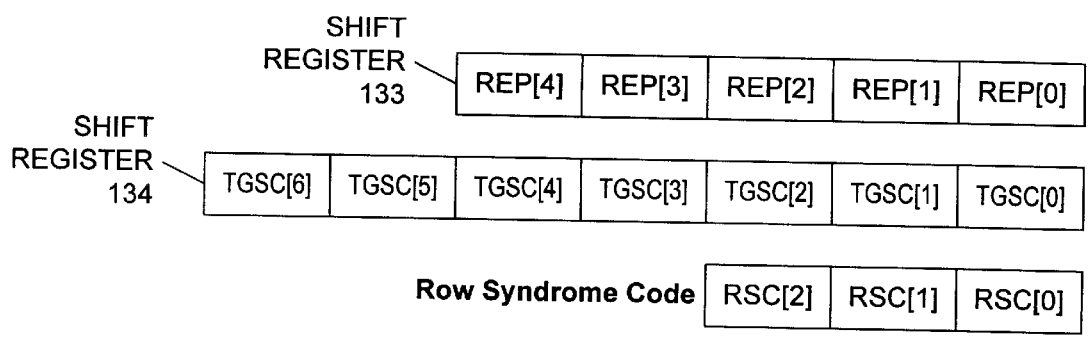
FIGS. 15–21 illustrate an exemplary generation of a row syndrome code.
Figure 16:
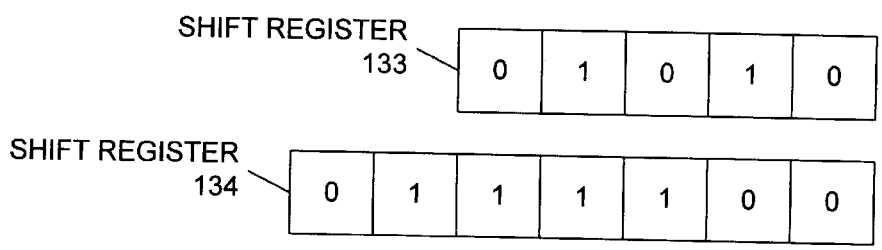
Figure 20:
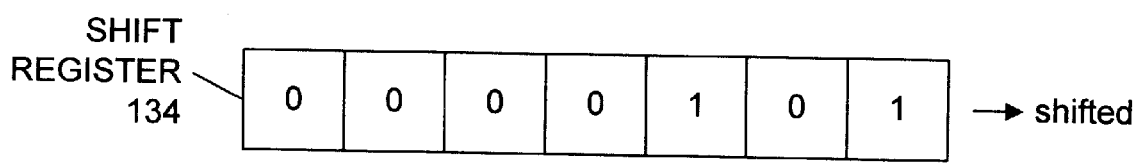
Figure 21:
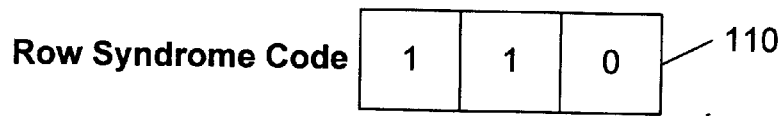
Figure 22:
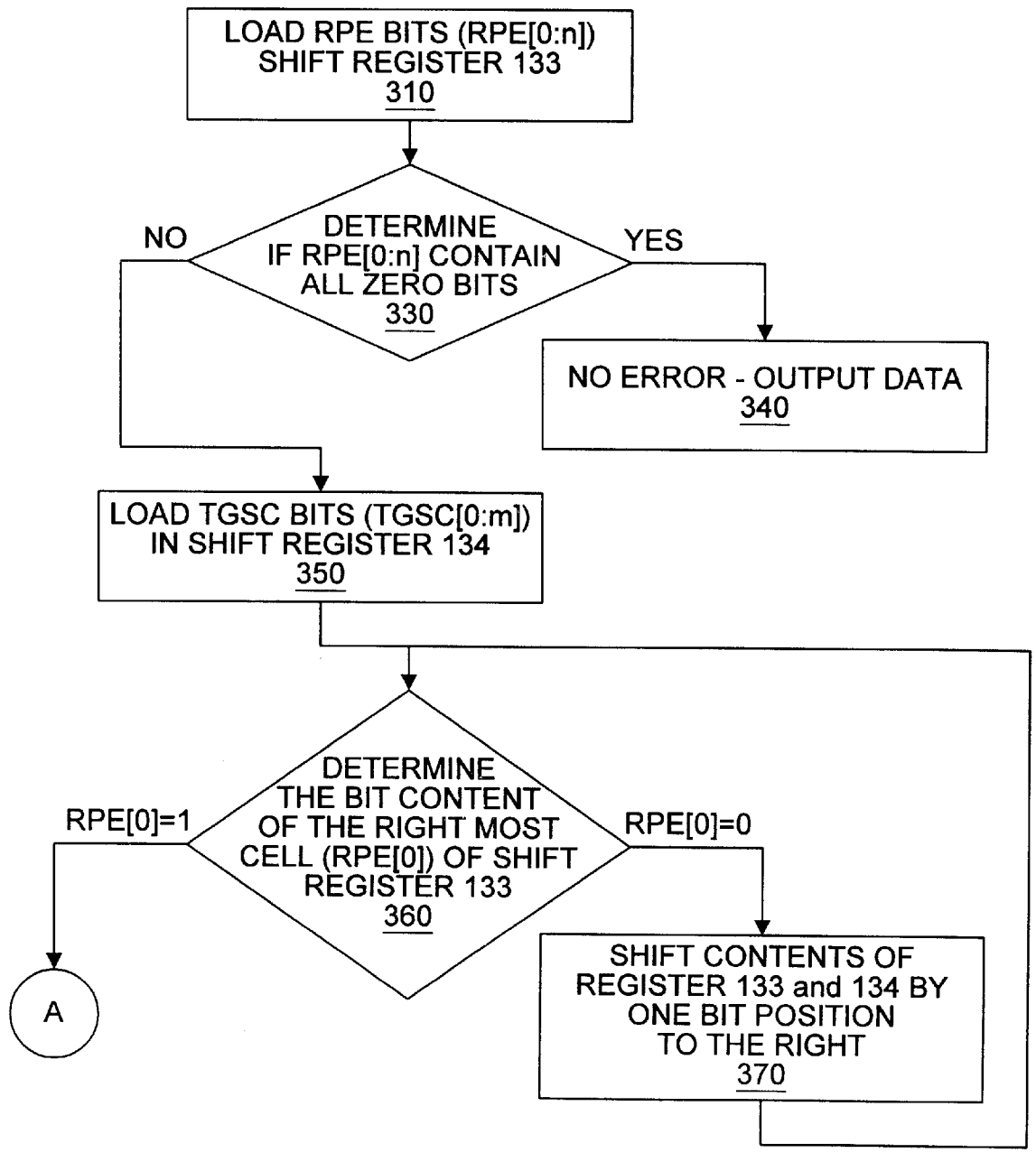
FIGS. 22 and 23 illustrate a flow diagram illustrating one embodiment of a linear decode process.
Figure 23:
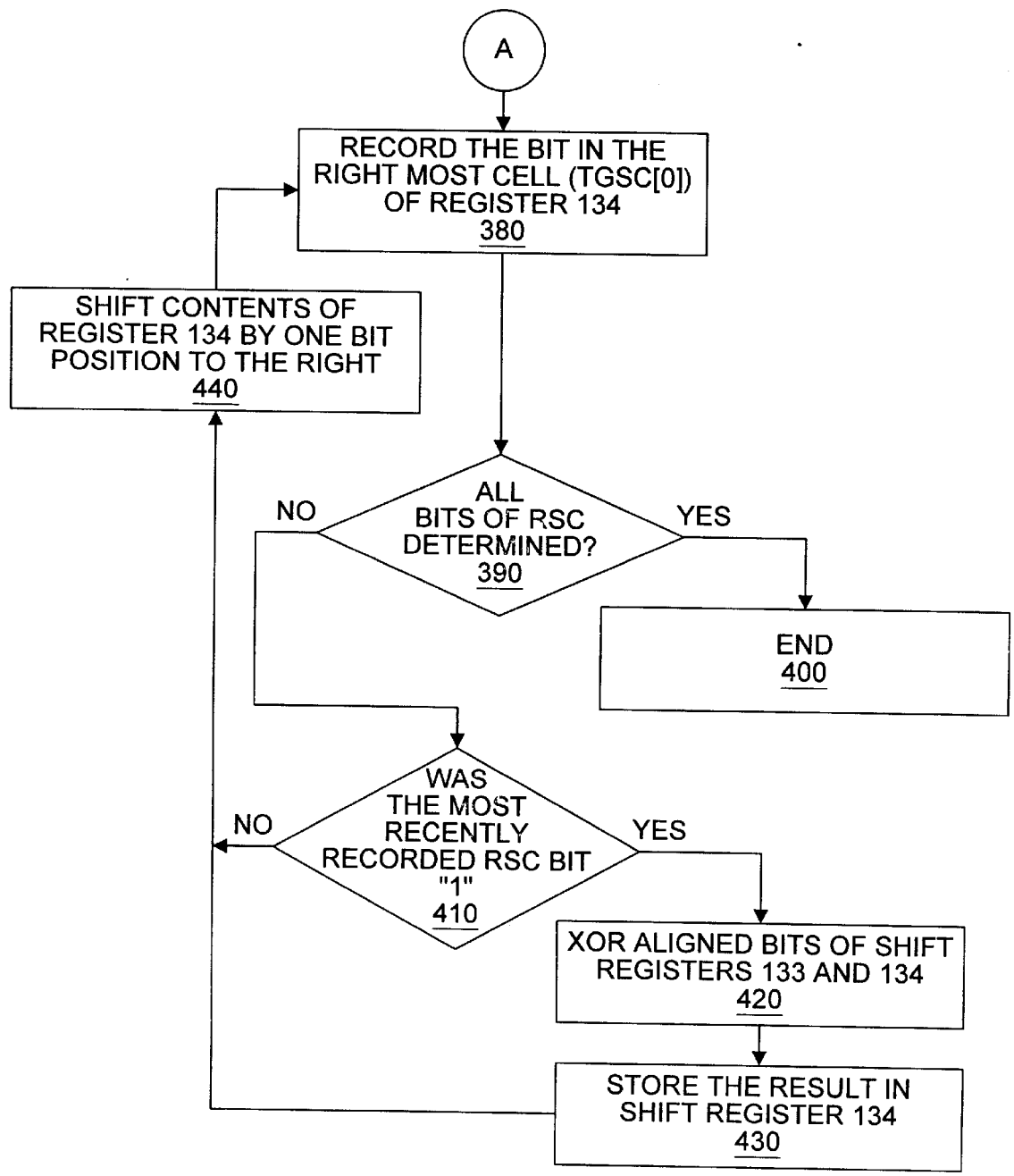

The operation of the linear shift unit 132 is explained with reference to FIGS. 15–21, along with the flow diagrams of FIGS. 22 and 23. As illustrated in FIG. 15, shift register 133 includes a plurality of cells RPE[0:4] for storing the row parity error bits (RPEs) for rows 0–4, respectively. Similarly, shift register 134 includes a plurality of cells TGSC[0:6] for storing the twisted global syndrome code. Referring collectively to FIGS. 15 and 22, initially, the row parity error bits RPEs are loaded into shift register 133, and control unit 135 determines whether the shift register contains all "0"s (steps 310 and 330). If shift register 133 contains all 0s, thus indicating that no single bit row errors exist, no data error is reported, and the data is output from the error control unit (step 340). On the other hand, if one or more row parity error bits are set, the twisted global syndrome code is loaded into shift register 134 (step 350). FIG. 16 illustrates the contents of shift registers 133 and 134 at this point in the methodology for the exemplary RPEs and twisted global syndrome code generated for the example associated with FIG. 10B.

Figure 17:
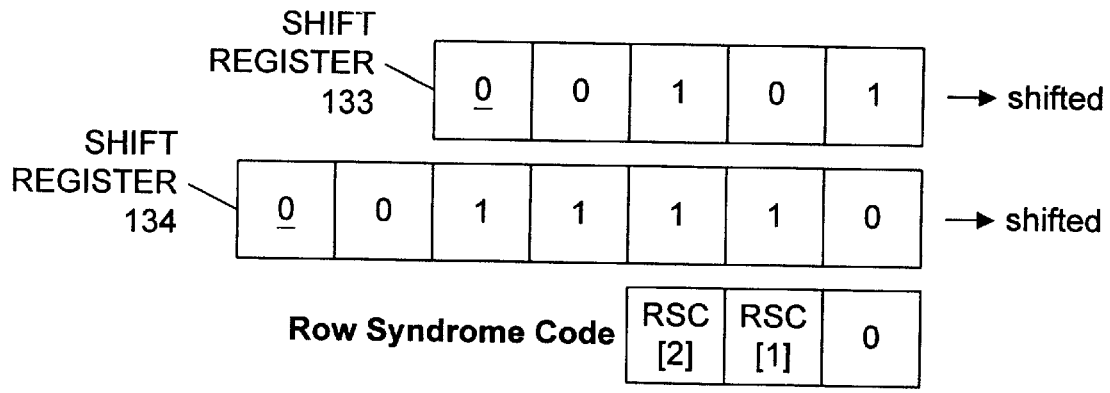

The content of the right-most cell of shift register 133 (cell RPE[0]) is then determined during step 360. If the value in the right-most cell RPE[0] of the shift register 133 is "0", the contents of both the shift register 133 and the shift register 134 are shifted one bit position to the right (step 370). The left-most parity in each of these registers is padded with a "0", and the values which are shifted from the right-most positions are discarded. This process repeats until the value in the right-most cell RPE[0] of register 133 is a "1". FIG. 17 illustrates the resulting values in shift registers 133 and 134 following this operation for the exemplary codes.

Figure 18:
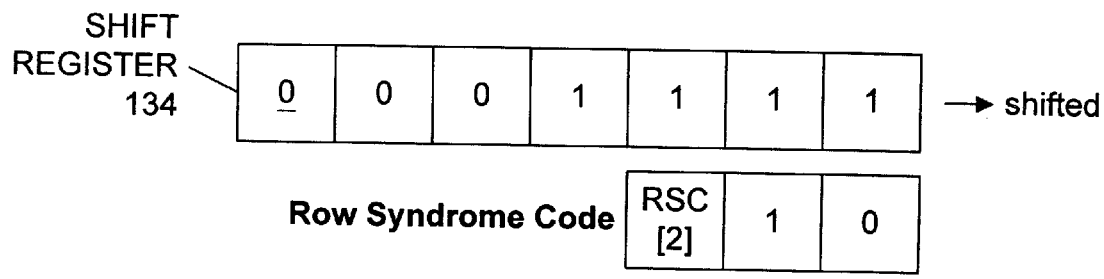

At this point, the bit value in the right-most cell of the register 134 is recorded as row syndrome code bit RSC[0], as is also shown in FIG. 17 (step 380). If all the row syndrome code bits have not yet been determined (step 390), a determination is made as to whether the last recorded row syndrome code bit was 1. If not, the contents of shift register 134 are again shifted by one position to the right (step 44) , and the process repeats. On the other hand, if the last row syndrome code bit recorded was 1, aligned bit positions of the first and second shift registers are XORed and the result is stored in the second shift register 134 (steps 420 and 430). In the illustrated example, the most recently recorded row syndrome code bit was "0", and thus the contents of the second shift register 134 are shifted by one position to the right (step 440), and the process repeats by recording the value in the right-most position of register 134 as the next RSC bit, as illustrated in FIG. 18.

Figure 19:
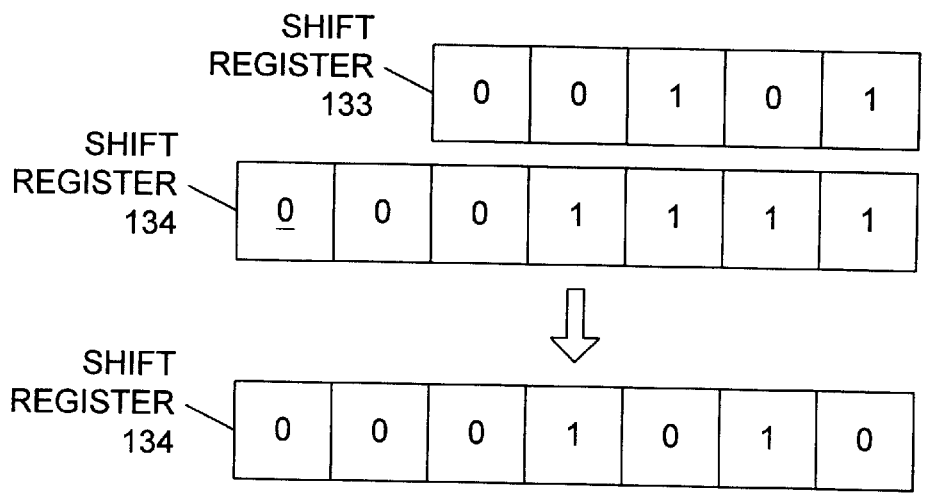

During the next iteration, since the last recorded RSC bit was "1", the value in shift register 133 is XORed with the value in shift register 134 (step 420) and the result is stored in shift register 134, as illustrated in FIG. 19. The contents of register 134 are again shifted by one position to the right as illustrated in FIG. 20 (step 440) and the resulting bit in the right-most position of shift register 134 is recorded as the next RSC bit, as illustrated in FIG. 21 (step 380). When all bits of the row syndrome code have been determined, the process ends (step 400).

The row syndrome code is indicative of the position of the error for any rows with an error. In the illustrated example, the binary value of the row syndrome code is 6. Referring to FIG. 3, bit position 6 corresponds to column D2, which is the position of the errors introduced in the example of FIG. 9A.

It is noted that alternative embodiments of the linear shift decode methodology described in conjunction with FIGS. 13–23 are possible. For example, rather than right shifting the values in shift registers 133 and 134, the values may be left shifted in a similar manner to derive the row syndrome code.

It is also noted that the received check bits may be decoded using other mechanisms. For example, mechanisms employing Gaussian Elimination could be used to decode the row parity error bits and the twisted global syndrome code to derive a row syndrome code.

It is additionally noted that in various embodiments, one of the rows (or logical groups) may be omitted in the calculation of the twisted global error correction code and the regenerated twisted global error correction code. For example, in the illustration of FIGS. 6A and 6B, the error correction code information relating to row R4 may be omitted from the generation of the twisted global error correction code. In such embodiments, the twisted global error correction code, the regenerated twisted global error correction code, and the twisted global syndrome code may each be expressed using one fewer bit. If a single bit error occurs in the logical group omitted in the calculation of the twisted and untwisted global error correction codes, the position of the error may still be determined using the untwisted global syndrome code.

FIGS. 24–39 are tables which illustrate another embodiment of a system which employs the linearly shifted technique for global syndrome code generation as described above. In the embodiment depicted by FIGS. 24–39, 262 bits of data are protected with is 26 check bits. The code is defined in terms of 288-bit blocks. The data bits within a block are denoted D[261:0]. The 26 check bits within a block consist of 8 parity bits P[7:0] an untwisted global error correction code consisting of 6 regular (untwisted) check bits R[5:0], and a twisted global error correction code consisting of 12 twisted check bits T[11:0].

The 288-bit block is divided into eight groups, denoted G[0] through G[7], each of which contains 36 bits. This code can correct one error per group G[0] through G[7], provided that all of the errors occur in the same position within each group. The code can further detect arbitrary double-bit errors, as described above.

The parity bits P[7:0], the regular check bits R[5:0], and the twisted check bits T[11:0] are calculated according to the tables of FIGS. 24–31. Each table lists the 36 bit positions within the group and the contents of each bit position. For example, G[0][0] contains P[0], G[0][29] contains D[27], and G[1][02] contains T[2], and so on. The remaining rows in each table give the rules for calculating the check bits. Each check bit is the exclusive-or of certain values. More particularly, the values which contribute to a particular check bit are indicated using a "1" at the appropriate positions in the tables. For example, parity bit P[0] is the exclusive-or of G[0][35:1]. Since the parity bits P[7:0] depend upon certain ones of the check bits R[5:0] and T[11:0], the check bits R[5:0] and T[11:0] can be calculated before calculating the parity bits P[7:0]. Similarly, since the regular check bits R[5:0] depend upon certain ones of the twisted check bits T[11:0], the twisted check bits T[11:0] can be calculated first, and subsequently the regular check bits R[5:0]. Alternate rules for calculating the parity error bits and the check bits directly from the data, and in any order, can also be derived.

It is noted that in this example, there are total of 36 entries in each group. Accordingly, the system may be constructed such that a total of 36 memory chips are used, each storing a bit from a corresponding position of each group.

When the data are received, parity error bits Q[7:0] and regenerated check bits S[5:0] and V[11:0] (the regenerated untwisted and twisted global error correction codes) are calculated by taking the exclusive-or of the received values, in accordance with the assignment tables of FIGS. 32–39. In addition, a global parity error bit Q may be calculated taking the exclusive-or of Q[7:0].

Figure 40:
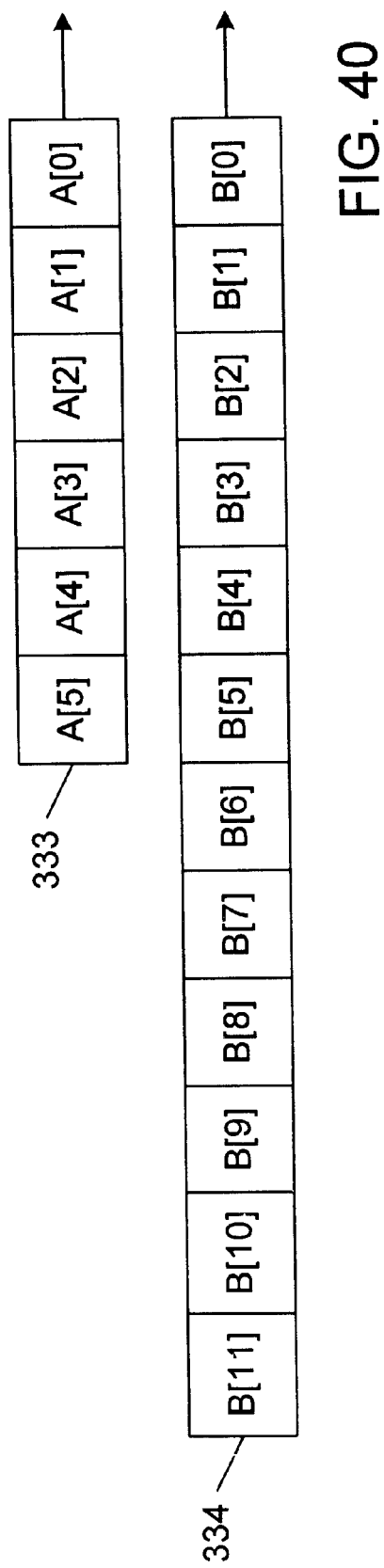
FIG. 40 illustrates a linear decode process.

In certain cases, it is necessary to generate a row syndrome U[5:0] (i.e., the row or group syndrome code). This untwisted syndrome is a function of V[11:0] and Q[7:0]. As illustrated in FIG. 40 and like the previous example, the untwisted syndrome U[5:0] can be calculated using parallel shift registers, 333 and 334, which are similar to the registers 133 and 134 illustrated in FIG. 15.

Shift register 333 contains 7 cells, A[6:0], and shift register 334 contains 12 cells, B[11:0]. Each cell holds a single bit. The shift registers 333 and 334 are separately controlled. When a shift register is made to shift, it transfers the contents of each cell one position to the right, outputs the value that was in its right-most cell, and loads a "0" into its left-most cell. Similar to the previous description, it is also possible to calculate the XOR of shift register 333 and shift register 334 and store the contents into shift register 334 (shift register 333 is logically padded with 0s in positions 11:7 when the XOR is computed).

The untwisted row syndrome U[5:0] is calculated as follows:

1. Load Q[i] in cell A[i], $0 \leq i \leq 6$, and load V[i] in cell B[i], $0 \leq i \leq 11$.
2. While A[0] contains 0:
   a. Shift both shift register 333 and shift register 334 right one position, discarding the values shifted out.
3. For i=0 through 5:
   a. Set U[i]=B[0].
   b. If B[0]=1, calculate the XOR of shift register 333 and shift register 334 and place the result in shift register 334 (that is, B[j]=A[j] XOR B[j], $0 \leq j \leq 6$).
   c. Shift shift register 334 right one position, discarding the value shifted out.

Given Q, Q[7:0], S[5:0] and U[5:0], errors are corrected as follows. The description of what type of error has occurred assumes that the errors are within the considered type (namely 1 or 2 errors in arbitrary locations or 0 to 8 errors, all in the same position within their group).

1. If Q=0:
   a. If S[5:0]=00000000:

i. If Q[7:0]=00000000, no error has occurred.

ii. If Q[7:0]≠00000000, a correctable error has occurred. Complement the bits in all locations of the form G[i][j], 0≦i≦7, 0≦j≦35, where Q[i]=1 and j=U[5:0](viewed as a binary number). (If U[5:0]>35, an uncorrectable error not in the class of considered errors has occurred).

b. If S[5:0]≠00000000, an uncorrectable error has occurred.

2. If Q=1: A correctable error has occurred. Complement the bits in all locations of the form G[i][j], 0≦i≦7, 0≦j≦35, where Q[i]=1 and j=S[5:0] (viewed as a binary number). (If S[5:0]>35, an uncorrectable error not in the class of considered errors has occurred).

It is noted that no error has occurred if Q[7:0]=00000000 and S[5:0]=000000. It is also noted that U[5:0] only needs to be calculated in case 1 .a.ii (which indicates a correctable error has occurred).

In the embodiment illustrated by FIGS. 22–37, the twisted global error correction code formed by twisted check bits T[11:0] are generated directly from a predetermined combination of the data bits. Each twisted check bit T[11:0] is stored at a position within each group such that it is the only check bit that covers that position. For example, as illustrated in FIG. 32, the twisted check bit T0 is stored at position G[0][01], and is the only check bit which contributes to the regenerated twisted check bit V[0], and so. In addition, it is noted that the parity bits P[7:0] for each data group include certain twisted check bits stored within that group. Since the parity bits are stored within position [00] of the various groups, further efficiency may be attained.

Alternative embodiments are also possible. For example, in another contemplated embodiment, the error correction codes generated for the logical groups are "cyclically" shifted (rather than linearly shifted) and are XORed together to derive the shifted global error correction code as well as the regenerated shifted error correction code.

Figure 7B:
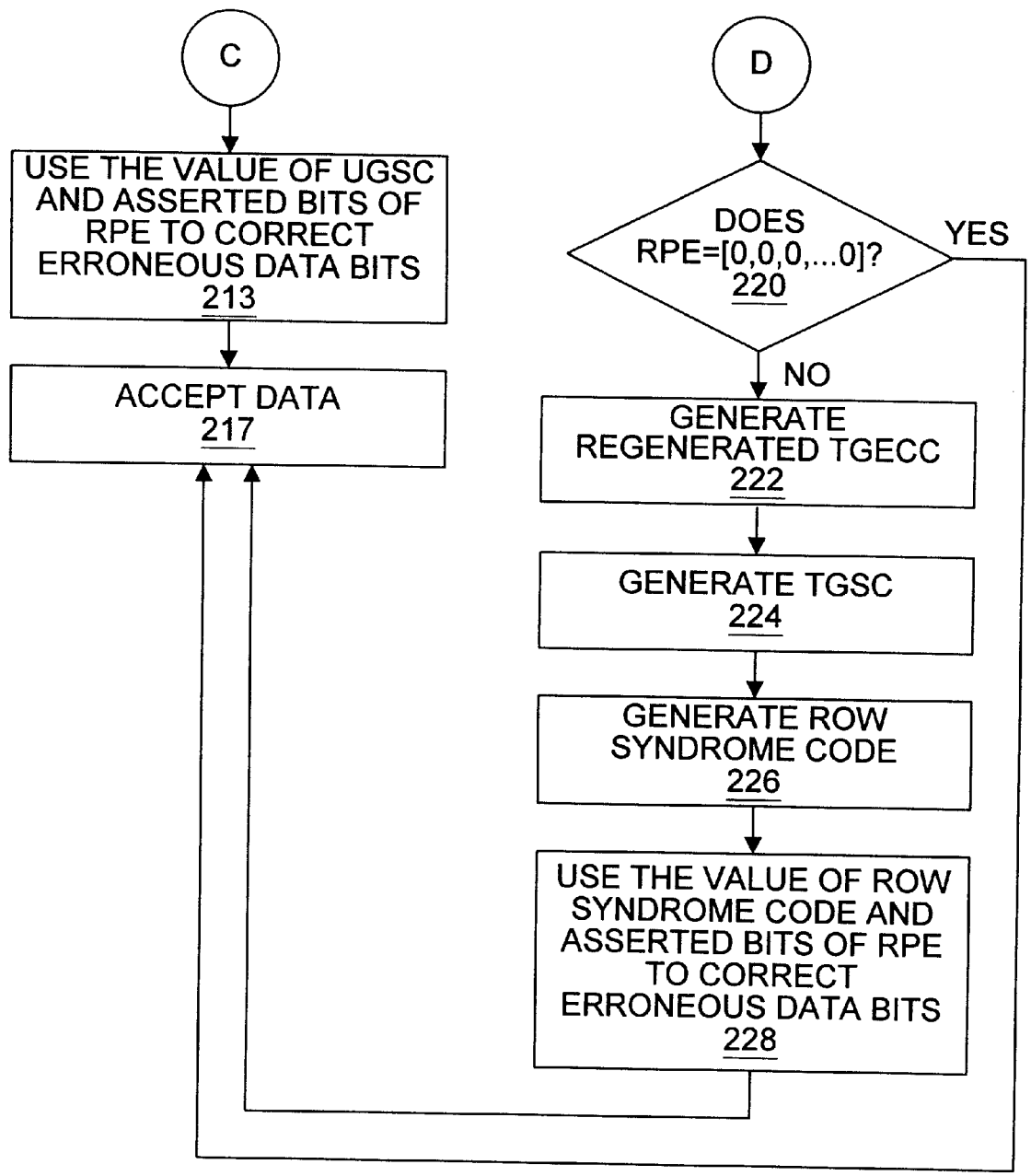

In addition, it is noted that in other embodiments, path "C" of the flow diagram of FIG. 7B may be omitted. In such embodiments, when an odd number of parity error bits are asserted, the position of an error may be determined using the twisted global syndrome code.

Figure 41:
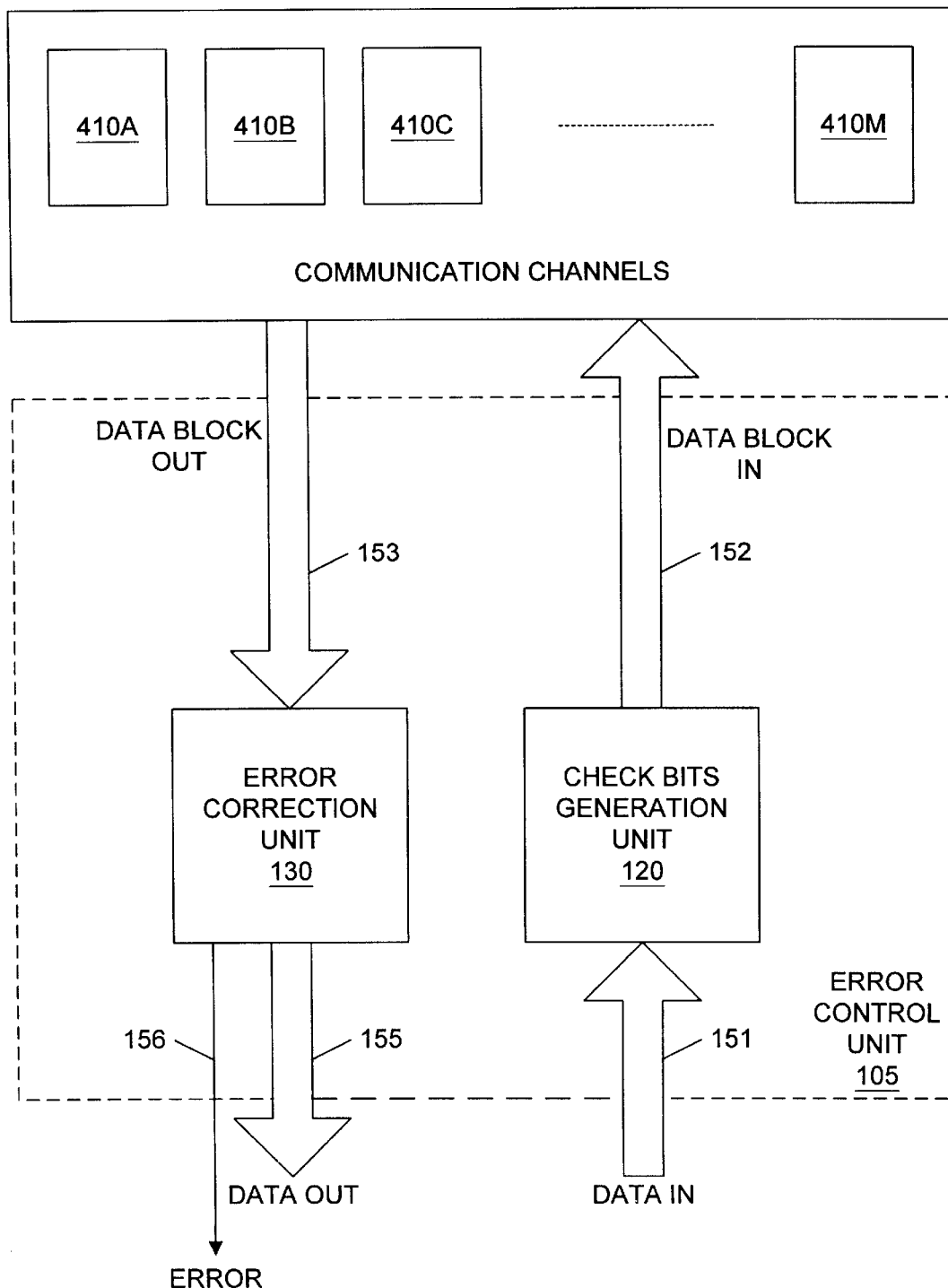
FIG. 41 is a block diagram of a system in accordance with another embodiment of the present invention.

Finally, FIG. 41 illustrates an embodiment wherein a data block protected in accordance with the foregoing techniques is conveyed through a plurality of communication channels 410A . . . 410M. Each communication channel 410A–410M is illustrative of, for example, a wire or other transmission medium. Similar to the previous embodiments, different bits in each logical group are conveyed through different communication channels.

While the present invention has been described with reference to particular embodiments, it will be understood that the embodiments are illustrative and that the invention scope is not so limited. Any variations, modifications, additions and improvements to the embodiments described are possible. These variations. modifications, additions and improvements may fall within the scope of the invention as detailed within the following claims.

What is claimed is:

1. A system for detecting and correcting data errors, comprising:

a check bits generation unit for receiving a plurality of data bits, wherein said check bits generation unit is configured to generate a parity bit corresponding to each of a plurality of groupings of said data bits, and wherein said check bits generation unit is configured to generate a first global error correction code equivalent to a first predetermined combination of a set of error correction codes each individually associated with a corresponding one of said plurality of groupings, and wherein said check bits generation unit is configured to generate a second global error correction code equivalent to a second predetermined combination of said set of error correction codes;

an error correction unit coupled to receive said plurality of data bits, said parity bit for each of said plurality of groupings, said first global error correction code, and said second global error correction code, wherein said error correction unit is configured to generate a parity error bit for each of said plurality of groupings of said data bits as received, and wherein said error correction unit is configured to generate a first global syndrome code based upon said first global error correction code to determine the existence of double-bit errors at different positions in any of said plurality of groupings if an even total number of parity error bits of said plurality of groupings is asserted, and wherein said error correction unit is configured to generate a second global syndrome code based upon said second global error correction code to determine a position of an error if an odd total number of parity bits of said plurality of groupings is asserted;

wherein said first global error correction code is derived by bit-wise shifting at least some of said error correction codes and by XORing aligned bits of a plurality of resulting shifted error correction codes.

2. The system as recited in claim 1 wherein said second global error correction code is equivalent to an exclusive OR of said set of error correction codes.

3. The system as recited in claim 2 wherein said first global syndrome code depends upon a difference between said first global error correction code and a regenerated first global error correction code.

4. The system as recited in claim 3 wherein said second global syndrome code depends upon a difference between said second global error correction code and a regenerated second global error correction code.

5. The system as recited in claim 4 wherein, if an even total number of parity error bits of said plurality of groupings is set, and if said second global syndrome code is not equal to a predetermined value, said error correction unit is configured to responsively generate an error signal.

6. The system as recited in claim 5 wherein said predetermined value is an all-zeros value.

7. The system as recited in claim 6 wherein, if an even total number of parity error bits of said plurality of groupings is set, and if said second syndrome code is equal to said all-zeros value, said error correction unit is configured to responsively use a value of a row syndrome code to determine a position of an error within each of said plurality of groupings of said data bits, wherein said error correction unit is configured to derive said row syndrome code from said first global syndrome code.

8. The system as recited in claim 7 wherein, if an odd total number of parity error bits of said plurality of groupings is set, said error correction unit is configured to responsively use a value of said second syndrome code to determine a position of an error.

9. The system as recited in claim 1 wherein said first global error correction code is equivalent to a predetermined function of said set of error correction codes.

10. The system as recited in claim 9 wherein each bit of said first global error correction code is equivalent to an exclusive OR of a predetermined set of bits of said set of error correction codes.

11. The system as recited in claim 1 wherein said plurality of data bits include a total of X groupings, and wherein said first global error correction code is derived by shifting said error correction code for a given ith group by i bit positions, wherein i=0 to X−1, and by XORing a plurality of resulting shifted error correction codes together.

12. The system as recited in claim 11 wherein said first global error correction code is derived by linearly shifting said error correction code for said given ith group by i bit positions.

13. The system as recited in claim 11 wherein said first global error correction code is derived by cyclically shifting said error correction code for said given ith group by i bit positions.

14. The system as recited in claim 1 wherein said error correction unit is further configured to correct errors within any of said plurality of groupings due to a single component failure.

15. The system as recited in claim 1 further comprising a component into which said plurality of data bits, said parity bit for each of said plurality of groupings, and said first and second global error correction codes are conveyed prior to being provided to said error correction unit.

16. The system as recited in claim 15 wherein said component includes a plurality of memory chips.

17. The system as recited in claim 16 wherein each bit within a particular grouping of data bits is stored in a separate memory chip, whereby no two bits of any given grouping are stored within the same memory chip.

18. The system as recited in claim 17 wherein bits at corresponding positions within the said plurality of groupings are stored within the same memory chip.

19. The system as recited in claim 15 wherein said component includes a plurality of communication paths.

20. The system as recited in claim 1 wherein said error correction code for each of said plurality of groupings is a single error correction Hamming code.

21. A system for detecting and correcting data errors, comprising:
   a check bits generation unit for receiving a plurality of data bits, wherein said check bits generation unit is configured to generate a parity bit corresponding to each of a plurality of groupings of said data bits, and wherein said check bits generation unit is configured to generate an untwisted global error correction code equivalent to a first combination of error correction codes each individually associated with a corresponding done of said plurality of groupings, and wherein said check bits generation unit is configured to generate a twisted global error correction code equivalent to a second combination of error correction codes each individually associated with a corresponding one of said plurality of groupings;
   an error correction unit coupled to receive said plurality of data bits, said parity bit for each of said plurality of groupings, and said untwisted and twisted global error correction codes, wherein said error correction unit is configured to generate a parity error bit for each of said plurality of groupings of said data bits as received, and wherein said error correction unit is configured to generate a twisted global syndrome code based upon said twisted global error correction code to determine the existence of double-bit errors at different positions in any of said plurality of groupings if an even total number of parity error bits of said plurality of groupings is asserted, and wherein said error correction unit is configured to generate an untwisted global syndrome code based upon said twisted global error correction code to determine a position of an error if an odd total number of parity bits of said plurality of groupings is asserted.

22. A method for correcting data errors comprising:
   receiving a plurality of data bits;
   generating a parity bit corresponding to each of a plurality of groupings of said data bits;
   generating an untwisted global error correction code equivalent to a first combination of error correction codes each individually associated with a corresponding one of said plurality of groupings;
   generating a twisted global error correction code equivalent to a second combination of error correction codes each individually associated with a corresponding one of said plurality of groupings;
   receiving said plurality of data bits, said parity bit for each of said plurality of groupings, and said untwisted and twisted global error correction codes;
   generating a parity error bit for each of said plurality of groupings of said data bits as received; and
   if an even total number of parity error bits of said plurality of groupings is asserted, generating a twisted global syndrome code based upon said twisted global error correction code to determine the existence of double-bit errors at different positions in any of said plurality of groupings; and
   if an odd total number of parity error bits of said plurality of groupings is asserted, generating an untwisted global syndrome code based upon said untwisted global error correction code to determine a position of an error.

23. The method as recited in claim 22 wherein said unshifted global error correction code is equivalent to an exclusive OR of said error correction codes.

24. The method as recited in claim 23 wherein said shifted global error correction code is derived by bit-wise shifting at least some of said error correction codes and by XORing aligned bits of a plurality of resulting shifted error correction codes.

25. The method as recited in claim 24 wherein said plurality of data bits include a total of X groupings, and wherein said global error correction code is derived by shifting said error correction code for a given ith group by i bit positions, wherein i=0 to X−1, and by XORing a plurality of resulting shifted error correction codes together.

26. The method as recited in claim 25 further comprising generating a row syndrome code dependent upon said twisted global syndrome code if said even total number of parity error bits is asserted, wherein said row syndrome code is a value which indicates said position of said error.

* * * * *

UNITED STATES PATENT AND TRADEMARK OFFICE
CERTIFICATE OF CORRECTION

PATENT NO.    : 6,453,440 B1
DATED         : September 17, 2002
INVENTOR(S)   : Robert Cypher It is certified that error appears in the above-identified patent and that said Letters Patent is hereby corrected as shown below:

<u>Column 17,</u>
Line 48, please change "done" to -- one --.

Signed and Sealed this

Sixth Day of May, 2003

JAMES E. ROGAN
*Director of the United States Patent and Trademark Office*